United States Patent
Ng et al.

(10) Patent No.: US 11,774,037 B2
(45) Date of Patent: Oct. 3, 2023

(54) AUXILIARY DISPLAY KICKSTAND

(71) Applicant: MOBILE PIXELS INC., Irwindale, CA (US)

(72) Inventors: Wenglong Ng, Burlington, MA (US); Xiaoliang Yao, Burlington, MA (US); Zikang Feng, North Reading, MA (US)

(73) Assignee: MOBILE PIXELS INC., Irwindale, CA (US)

( * ) Notice: Subject to any disclaimer, the term of this patent is extended or adjusted under 35 U.S.C. 154(b) by 47 days.

(21) Appl. No.: 17/688,266

(22) Filed: Mar. 7, 2022

(65) Prior Publication Data

US 2022/0282828 A1    Sep. 8, 2022

Related U.S. Application Data

(60) Provisional application No. 63/157,569, filed on Mar. 5, 2021.

(51) Int. Cl.
  *F16M 13/00*   (2006.01)
  *G06F 1/16*    (2006.01)

(52) U.S. Cl.
  CPC ............. *F16M 13/00* (2013.01); *G06F 1/166* (2013.01); *G06F 1/1647* (2013.01)

(58) Field of Classification Search
  CPC ... A47B 23/044; A47B 23/043; G06F 1/1626; G06F 1/1628; G06F 1/1647; G06F 1/166; F16M 13/00
  See application file for complete search history.

(56) References Cited

U.S. PATENT DOCUMENTS

| | | | | |
|---|---|---|---|---|
| 2,587,316 | A | * 2/1952 | Henry | B42D 3/126 206/45.24 |
| 3,119,194 | A | * 1/1964 | Ray | A47B 23/044 248/459 |
| D247,194 | S | 2/1978 | Win | |
| 4,318,527 | A | * 3/1982 | Smith | A47B 23/044 248/459 |
| 4,569,613 | A | 2/1986 | Thomas | |

(Continued)

FOREIGN PATENT DOCUMENTS

EP    2505904 A2 * 10/2012 ........... A47B 23/044

*Primary Examiner* — Eret C McNichols
(74) *Attorney, Agent, or Firm* — Lando & Anastasi, LLP

(57) ABSTRACT

According to an aspect of the disclosure, a support system includes at least one coupling element configured to be coupled to an auxiliary display system, a plurality of support portions, a plurality of joints, each joint of the plurality of joints being coupled to a first respective support portion and a second respective support portion of the plurality of support portions, the first respective support portion being rotatably coupled about a respective joint axis to the second respective support portion via the respective joint, and a foot coupled to the plurality of support portions, wherein rotating the plurality of support portions about the plurality of joints rotates the support system about an orientation axis in a continuous range of orientation angles between a minimum orientation angle and a maximum orientation angle, and wherein at least one of the plurality of joints or the foot resist a force of gravity to enable the support system to maintain any orientation angle in the continuous range of orientation angles.

19 Claims, 32 Drawing Sheets

(56) References Cited

U.S. PATENT DOCUMENTS

| | | |
|---|---|---|
| D290,404 S | 6/1987 | Stoler |
| 4,867,479 A | 9/1989 | Mizutani |
| 4,880,327 A * | 11/1989 | Sanabria .............. B42F 13/402 |
| | | 402/73 |
| 5,471,808 A | 12/1995 | De Pieri et al. |
| D374,650 S | 10/1996 | Shermeto |
| 5,590,021 A | 12/1996 | Register |
| 5,614,838 A | 3/1997 | Jaber et al. |
| D456,796 S | 5/2002 | Silver |
| 6,532,146 B1 | 3/2003 | Duquette |
| 6,667,877 B2 | 12/2003 | Duquette |
| 6,967,632 B1 | 11/2005 | Minami et al. |
| D534,588 S | 1/2007 | Nuttall |
| 7,283,353 B1 | 10/2007 | Jordan et al. |
| 7,660,914 B2 | 2/2010 | Perez et al. |
| D615,082 S | 5/2010 | Taichi |
| 7,848,091 B2 | 12/2010 | Han et al. |
| D630,628 S | 1/2011 | Kovac |
| D634,745 S | 3/2011 | Park et al. |
| 7,986,517 B2 | 7/2011 | Jiang et al. |
| 7,990,338 B2 | 8/2011 | Teng et al. |
| 8,018,715 B2 | 9/2011 | Chang |
| D652,832 S | 1/2012 | Wu et al. |
| D665,123 S | 8/2012 | Douglas |
| 8,314,751 B2 | 11/2012 | Yang |
| D672,781 S | 12/2012 | Lu |
| D673,158 S | 12/2012 | Yang et al. |
| D674,220 S | 1/2013 | Kim |
| 8,393,464 B2 * | 3/2013 | Yang ...................... A45C 11/00 |
| | | 206/320 |
| D679,279 S | 4/2013 | Yang et al. |
| D687,438 S | 8/2013 | Lu |
| 8,529,111 B2 | 9/2013 | Chang |
| D690,702 S | 10/2013 | Chung |
| 8,640,864 B2 * | 2/2014 | Chen ...................... G06F 1/1628 |
| | | 206/320 |
| 8,757,375 B2 * | 6/2014 | Huang ................. A47B 23/043 |
| | | 206/45.24 |
| D710,859 S | 8/2014 | Mecchella et al. |
| 8,800,763 B2 * | 8/2014 | Hale ...................... G06F 1/1628 |
| | | 206/320 |
| D715,301 S | 10/2014 | Ashcraft et al. |
| D723,040 S | 2/2015 | Kang et al. |
| D726,191 S | 4/2015 | Tseng et al. |
| D726,192 S | 4/2015 | Massucco et al. |
| D727,895 S | 4/2015 | Aoki et al. |
| D730,913 S | 6/2015 | Shao |
| 9,049,911 B1 * | 6/2015 | Wood ..................... A45C 11/00 |
| 9,226,559 B1 | 1/2016 | Diebel et al. |
| 9,320,164 B1 | 4/2016 | Diebel et al. |
| 9,326,404 B1 * | 4/2016 | Wood ..................... G06F 1/1626 |
| 9,332,813 B2 * | 5/2016 | Jiang ..................... G06F 1/1628 |
| D761,800 S | 7/2016 | Muller |
| 9,451,818 B2 * | 9/2016 | Buechin ............. A45C 13/1069 |
| D772,234 S | 11/2016 | Massucco et al. |
| D779,713 S | 2/2017 | Sonneman |
| D791,400 S | 7/2017 | Sonneman |
| 9,758,274 B2 * | 9/2017 | Melmon ................. A45C 11/00 |
| D808,950 S | 1/2018 | Miele et al. |
| 10,550,995 B1 | 2/2020 | Hung et al. |
| D883,990 S | 5/2020 | Yao et al. |
| 10,716,375 B2 * | 7/2020 | Buechin ................. A45C 11/00 |
| 10,716,376 B2 * | 7/2020 | Buechin ................. A45C 11/00 |
| 11,209,870 B1 * | 12/2021 | Li ........................... F16M 11/10 |
| 11,422,593 B2 * | 8/2022 | Perelli ................... G06F 1/1649 |
| 2003/0095373 A1 | 5/2003 | Duquette |
| 2003/0213886 A1 * | 11/2003 | Gilbert ................... F16M 11/10 |
| | | 248/454 |
| 2005/0162821 A1 | 7/2005 | Homer et al. |
| 2005/0243021 A1 | 11/2005 | Perez et al. |
| 2006/0082518 A1 | 4/2006 | Ram |
| 2006/0268500 A1 | 11/2006 | Kuhn |
| 2007/0080950 A1 | 4/2007 | Lee et al. |
| 2008/0252555 A1 | 10/2008 | Jeon |
| 2011/0216483 A1 | 9/2011 | Vesely |
| 2011/0298690 A1 | 12/2011 | Reilly |
| 2012/0127646 A1 | 5/2012 | Moscovitch |
| 2013/0020214 A1 * | 1/2013 | Chiou ................... G06F 1/1626 |
| | | 206/320 |
| 2013/0020216 A1 * | 1/2013 | Chiou ................... G06F 1/1626 |
| | | 206/320 |
| 2013/0277271 A1 | 10/2013 | Toulotte |
| 2014/0132133 A1 * | 5/2014 | Chiou ................... G06F 1/1613 |
| | | 312/223.2 |
| 2014/0284228 A1 * | 9/2014 | Chiou ................... G06F 1/1632 |
| | | 206/320 |
| 2015/0151871 A1 * | 6/2015 | Huang ................. H05K 5/0086 |
| | | 206/45.23 |
| 2016/0154434 A1 | 6/2016 | Lakhani |
| 2016/0286954 A1 * | 10/2016 | Wu ........................ H04M 1/04 |
| 2019/0332146 A1 | 10/2019 | Yao et al. |
| 2020/0121074 A1 * | 4/2020 | Orona ..................... B42D 3/126 |
| 2022/0273096 A1 * | 9/2022 | He ........................ F16M 11/105 |
| 2023/0020938 A1 * | 1/2023 | Liu ........................ F16M 11/10 |

* cited by examiner

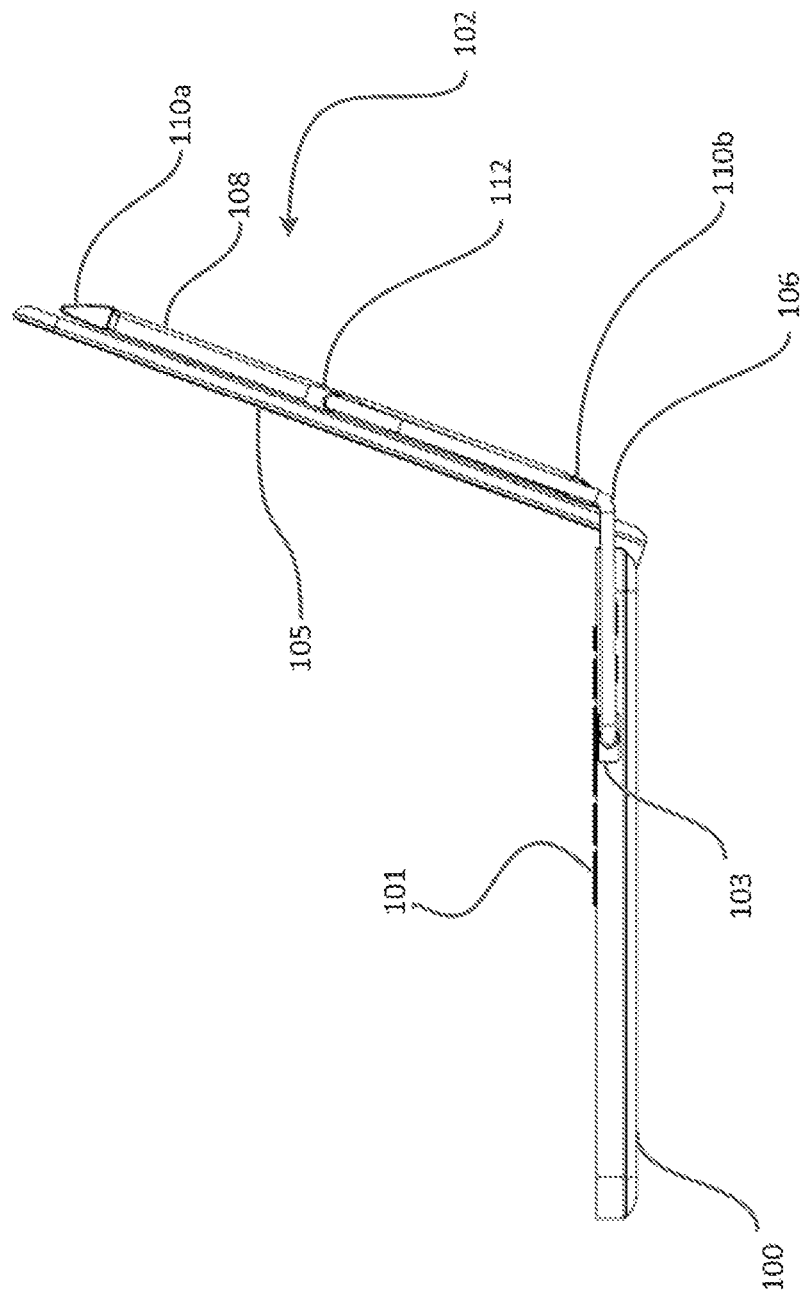

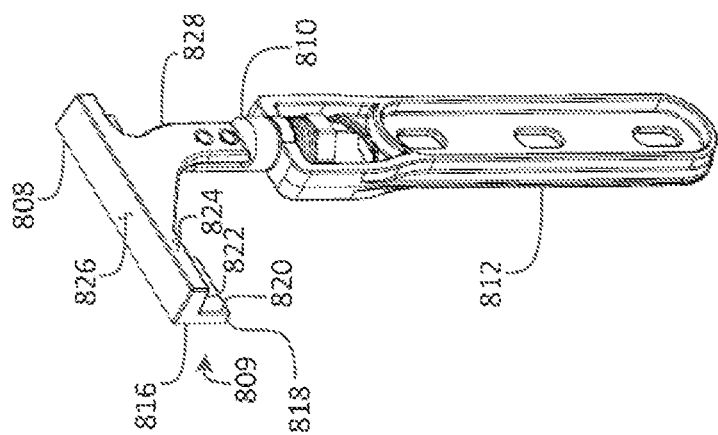
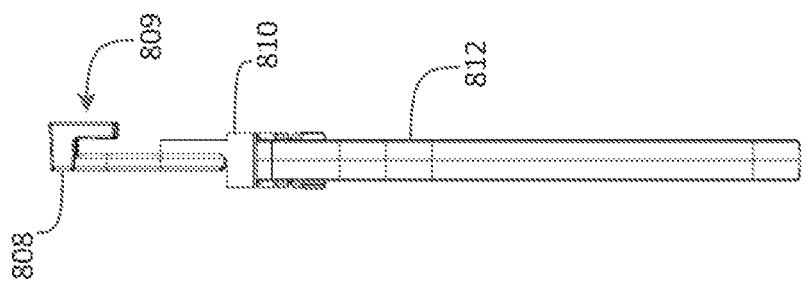
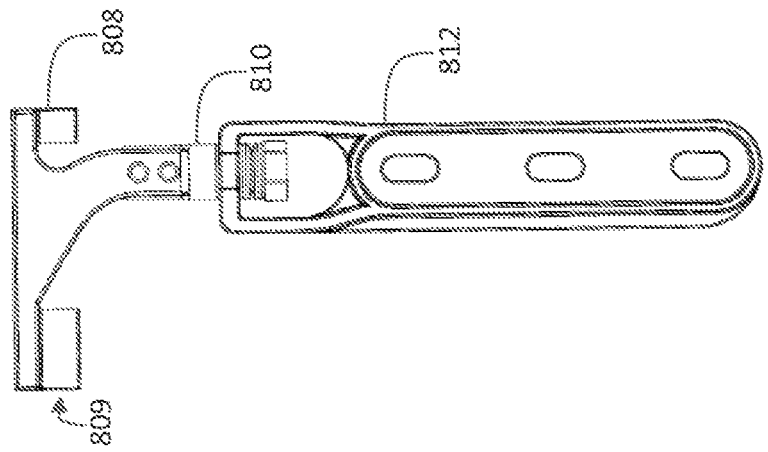
FIG. 9C
FIG. 9B
FIG. 9A

AUXILIARY DISPLAY KICKSTAND

CROSS-REFERENCE TO RELATED APPLICATIONS

This application claims priority under 35 U.S.C. § 119(e) to U.S. Provisional Application Ser. No. 63/157,569, titled "AUXILIARY DISPLAY KICKSTAND," filed on Mar. 5, 2021, which is hereby incorporated by reference in its entirety.

FIELD OF TECHNOLOGY

At least one example of the disclosure relates to support systems and, in some examples, to computer-display support systems.

SUMMARY

Aspects and embodiments disclosed herein relate to a support system comprising at least one coupling element configured to be coupled to an auxiliary display system, a plurality of support portions, a plurality of joints, each joint of the plurality of joints being coupled to a first respective support portion and a second respective support portion of the plurality of support portions, the first respective support portion being rotatably coupled about a respective joint axis to the second respective support portion via the respective joint, and one or more feet coupled to the plurality of support portions, wherein rotating the plurality of support portions about the plurality of joints rotates the support system about an orientation axis in a continuous range of orientation angles between a minimum orientation angle and a maximum orientation angle, and wherein at least one of the plurality of joints or the one or more feet resist a force of gravity to enable the support system to maintain any orientation angle in the continuous range of orientation angles.

In some examples, the plurality of support portions includes a first support portion, a second support portion, a third support portion, a fourth support portion, and a fifth support portion. In at least one example, the plurality of joints includes a first joint, a second joint, a third joint, a fourth joint, and a fifth joint. In various examples, the first support portion is coupled to the at least one coupling element. In some examples, the first support portion is rotatably coupled to the second support portion via the first joint and is rotatably coupled to the third support portion via the second joint. In at least one example, each of the first joint and the second joint deflects by up to approximately 72°. In various examples, a maximum deflection of each of the first joint and the second joint is approximately 3.84 mm.

In some examples, the second support portion is rotatably coupled to the fourth support portion via the third joint and the third support portion is rotatably coupled to the fifth support portion via the fourth joint. In at least one example, each of the third joint and the fourth joint deflects by up to approximately 70°. In various examples, a maximum deflection of each of the third joint and the fourth joint is approximately 3.88 mm. In some examples, the fourth support portion is rotatably coupled to the fifth support portion via the fifth joint. In at least one example, the fifth joint deflects by up to approximately 40°. In various examples, a maximum deflection of the fifth joint is approximately 4.33 mm.

In some examples, a width of each of the first joint and the second joint is approximately 148 mm. In at least one example, a width of each of the third joint and the fourth joint is approximately 106 mm. In various examples, a width of the fifth joint is approximately 13.3 mm. In some examples, the minimum orientation angle is approximately 95° from a surface on which the support system is positioned. In at least one example, the maximum orientation angle is approximately 137° from the surface on which the support system is positioned. In various examples, a flexural modulus of each joint of the plurality of joints is between 10-10,000 MPa.

In some examples, the plurality of support portions includes a first support portion, a second support portion, and a third support portion. In various examples, the plurality of joints includes a first joint and a second joint, and the first support portion is rotatably coupled to the second support portion via the first joint and the second support portion is rotatably coupled to the third support portion via the second joint. In at least one example, the plurality of support portions includes a fourth support portion. In some examples, the plurality of joints includes a third joint, and the fourth support portion is rotatably coupled to the second support portion via the third joint.

In various examples, the plurality of support portions includes a fifth support portion. In at least one example, the plurality of joints includes a fourth joint, and the fifth support portion is rotatably coupled to the third support portion via the fourth joint. In some examples, the plurality of joints includes a fifth joint, and the fourth support portion is rotatably coupled to the fifth support portion via the fifth joint. In various examples the first support portion is coupled to the at least one coupling element. In at least one example, an angle between the first joint and the second joint is approximately 120°. In some examples, an angle between the second joint and the fourth joint is approximately 60°.

In various examples, an angle between the fourth joint and the fifth joint is approximately 60°. In at least one example, an angle between the second joint and the fourth joint is within 1° of an angle between the first joint and the third joint. In some examples, an angle between the third joint and the fifth joint is within 1° of an angle between the first joint and the third joint. In various examples, the first support portion is coupled to the at least one coupling element. In at least one example, each joint of the plurality of joints is configured to rotate in one direction about a respective joint axis in an unflexed position of the respective joint axis. In some examples, the minimum orientation angle is at least 90° from a surface on which the support system is positioned. In various examples, the maximum orientation angle is approximately 137° from the surface on which the support system is positioned.

According to at least one aspect of the disclosure, a method of operation of a support system is provided comprising providing a support system having at least one coupling element configured to be coupled to an auxiliary display system, a plurality of support portions, a plurality of joints, each joint of the plurality of joints being coupled to a first respective support portion and a second respective support portion of the plurality of support portions, the first respective support portion being rotatably coupled about a respective joint axis to the second respective support portion via the respective joint, and a foot coupled to at least one of the plurality of support portions, and instructing a user to rotate the plurality of support portions about the plurality of joints such that the support system rotates about an orientation axis in a continuous range of orientation angles between a minimum orientation angle and a maximum orientation angle, wherein at least one of the plurality of joints or the foot resist a force of gravity to enable the support system to maintain any orientation angle in the continuous range of orientation angles. In at least one example, the method includes instructing the user to couple the support system to the auxiliary display system via the at least one coupling element.

According to at least one example, a method of operation of a support system is provided comprising providing a support system having at least one coupling element configured to be coupled to an auxiliary display system, a plurality of support portions, a plurality of joints, each joint of the plurality of joints being coupled to a first respective support portion and a second respective support portion of the plurality of support portions, the first respective support portion being rotatably coupled about a respective joint axis to the second respective support portion via the respective joint, and one or more feet coupled to the plurality of support portions, and instructing a user to rotate the plurality of support portions about the plurality of joints such that the support system rotates about an orientation axis in a continuous range of orientation angles between a minimum orientation angle and a maximum orientation angle, wherein at least one of the plurality of joints or the one or more feet resist a force of gravity to enable the support system to maintain any orientation angle in the continuous range of orientation angles.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 1D illustrates a side view of the auxiliary display system in the closed configuration according to an embodiment;

FIG. 9A illustrates a side view of a hinge assembly according to an embodiment;

FIG. 9B illustrates a front view of the hinge assembly according to an embodiment;

FIG. 9C illustrates a perspective view of the hinge assembly according to an embodiment;

DETAILED DESCRIPTION

Conventional laptop computers generally include a display screen to provide output information to a user, the size of which is determined at least partially for the purpose of optimizing user enjoyment. For example, although many users value laptop computers for their compactness and portability, which may require a reduction in display screen size, users also value display screens which are sufficiently large for the user to comfortably view displayed information. Accordingly, there is an inherent tension in selecting a display screen size for laptop computers having a single screen.

Design tensions associated with the implementation of a single screen may be circumvented with the addition of a second auxiliary screen communicatively coupled to the laptop computer. For example, a second auxiliary screen may be removably coupled to a backplane of a primary laptop screen. In use, a user may slide out or otherwise extend the auxiliary screen from a closed state and position the auxiliary screen in a desired orientation.

Adding a second auxiliary screen coupled to the backplane of the primary laptop screen avoids many of the design tradeoffs associated with increasing the size of a single screen. Modern laptop computer display screens are typically significantly larger in screen area than in screen thickness. Accordingly, whereas increasing the area of a single display screen yields a proportional increase in the amount of information conveyed by the display screen, adding a second auxiliary screen affixed to the backplane of the primary display screen provides approximately twice as much information at the cost of a relatively small increase in thickness. The addition of a second auxiliary screen therefore yields a significant increase in information density (i.e., the amount of information conveyed relative to the physical footprint of the laptop computer) compared to increasing the size of a single primary laptop screen.

Furthermore, in some embodiments, the user may position the auxiliary screen such that the display screen is antiparallel to the primary display screen and parallel to the backplane of the display screen. In this configuration, the auxiliary screen may be configured to function similar to a tablet computer which is capable of displaying output information and capable of receiving input information including inputs from a user's touch, inputs from a stylus, and so forth.

Figure 1A:
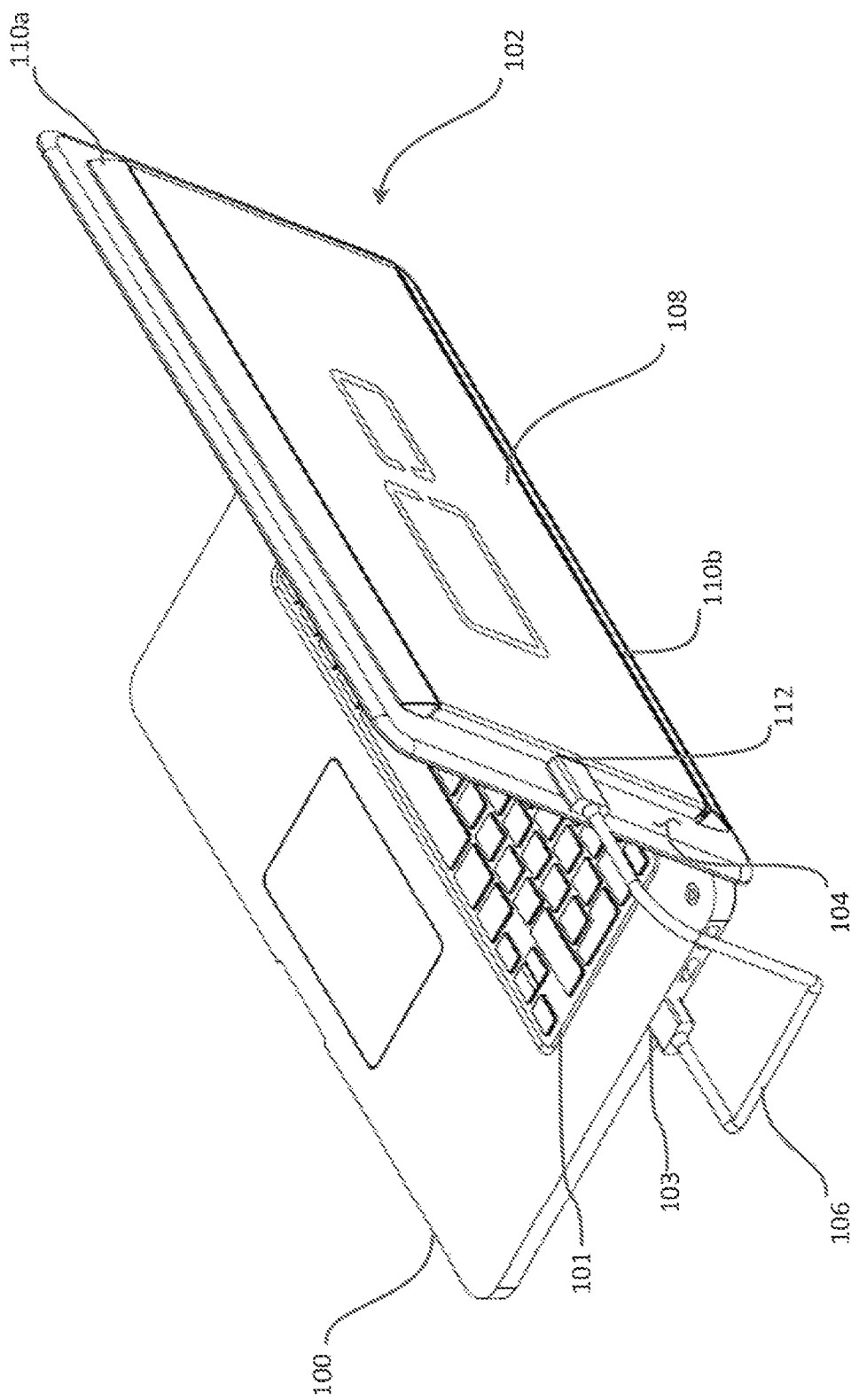
FIG. 1A illustrates a back perspective view of an auxiliary display system in a closed configuration according to an embodiment.

FIG. 1A illustrates a perspective view of a laptop computer 100 in combination with an auxiliary monitor 102 in a closed position according to one embodiment. The auxiliary monitor 102 may be configured to be removably coupled to a backplane 104 of the computer 100. The auxiliary monitor 102 may be further configured to be communicatively coupled to the laptop computer 100 via a wired connection 106.

The laptop computer 100 includes a keyboard portion 101 and a wired communications port 103. The auxiliary monitor 102 includes a display portion 108, a first rail 110a, a second rail 110b, and a wired communications port 112. The display portion 108 is generally configured to display information for viewing by a user. In some embodiments, the display portion 108 is configured to receive input information including, for example, touch inputs from a user's finger, inputs from a stylus operated by a user, and so forth.

In the embodiment illustrated by FIG. 1A, the display portion 108 is in a closed position such that a screen of the display portion 108 is not visible to a user. The first rail 110a and the second rail 110b are configured to allow the display portion 108 to slide in either direction of at least one dimension. The wired communications port 112 is configured to be coupled to the wired connection 106 to establish communication with the wired communications port 103. For example, the wired communications port 103 and the wired communications port 112 may be configured according to one of several standards, including DisplayPort, Mini DisplayPort, HDMI, VGA, DVI, USB-A, USB-C, Micro-USB, Mini-USB, and so forth. In some embodiments, the wired communications port 103 is configured according to the USB-C standard, the wired communications port 112 is configured according to the USB-A standard, and the wired connection 106 includes a USB-A to USB-C connection standard.

Figure 1B:
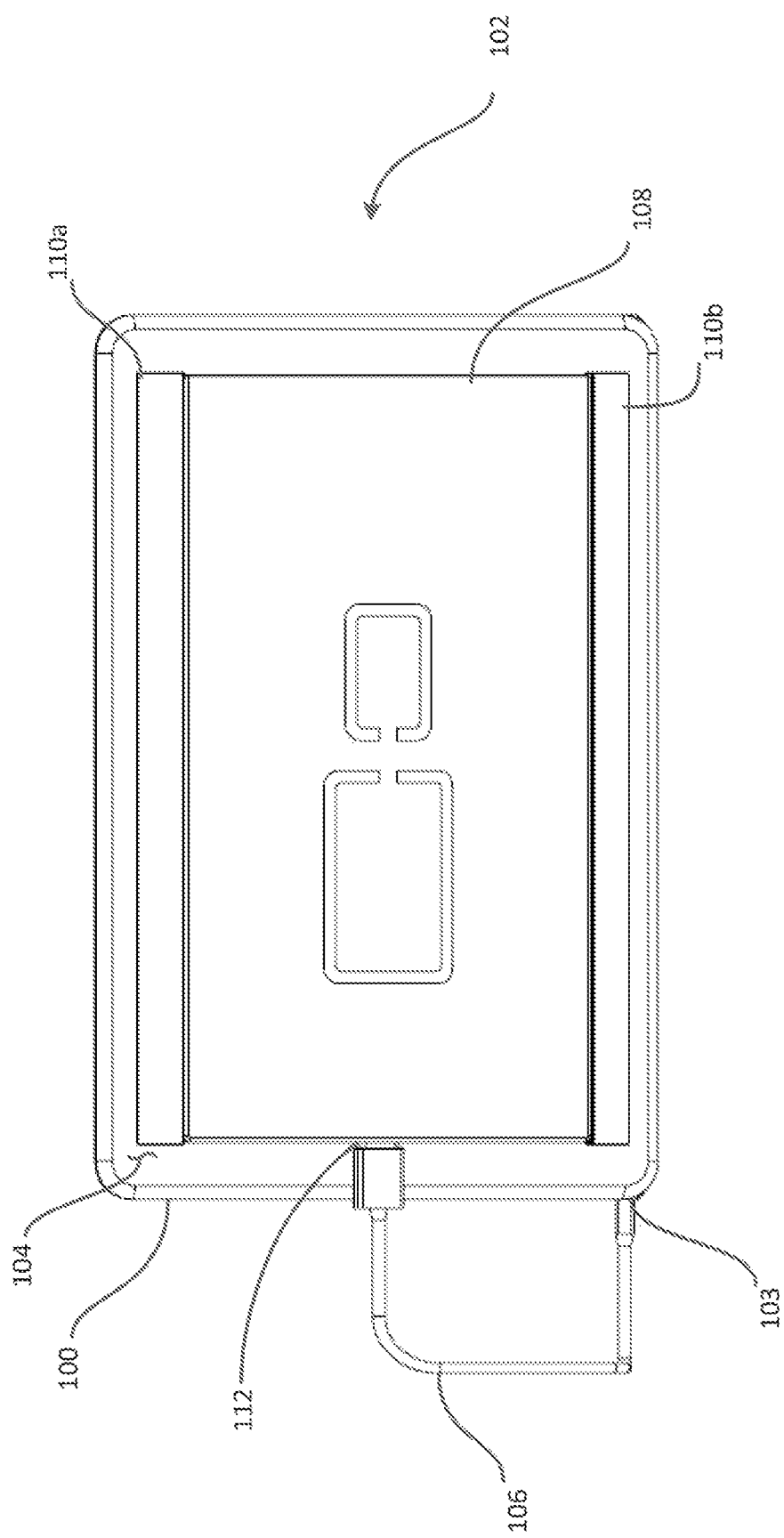
FIG. 1B illustrates a back view of the auxiliary display system in the closed configuration according to an embodiment.
Figure 1C:
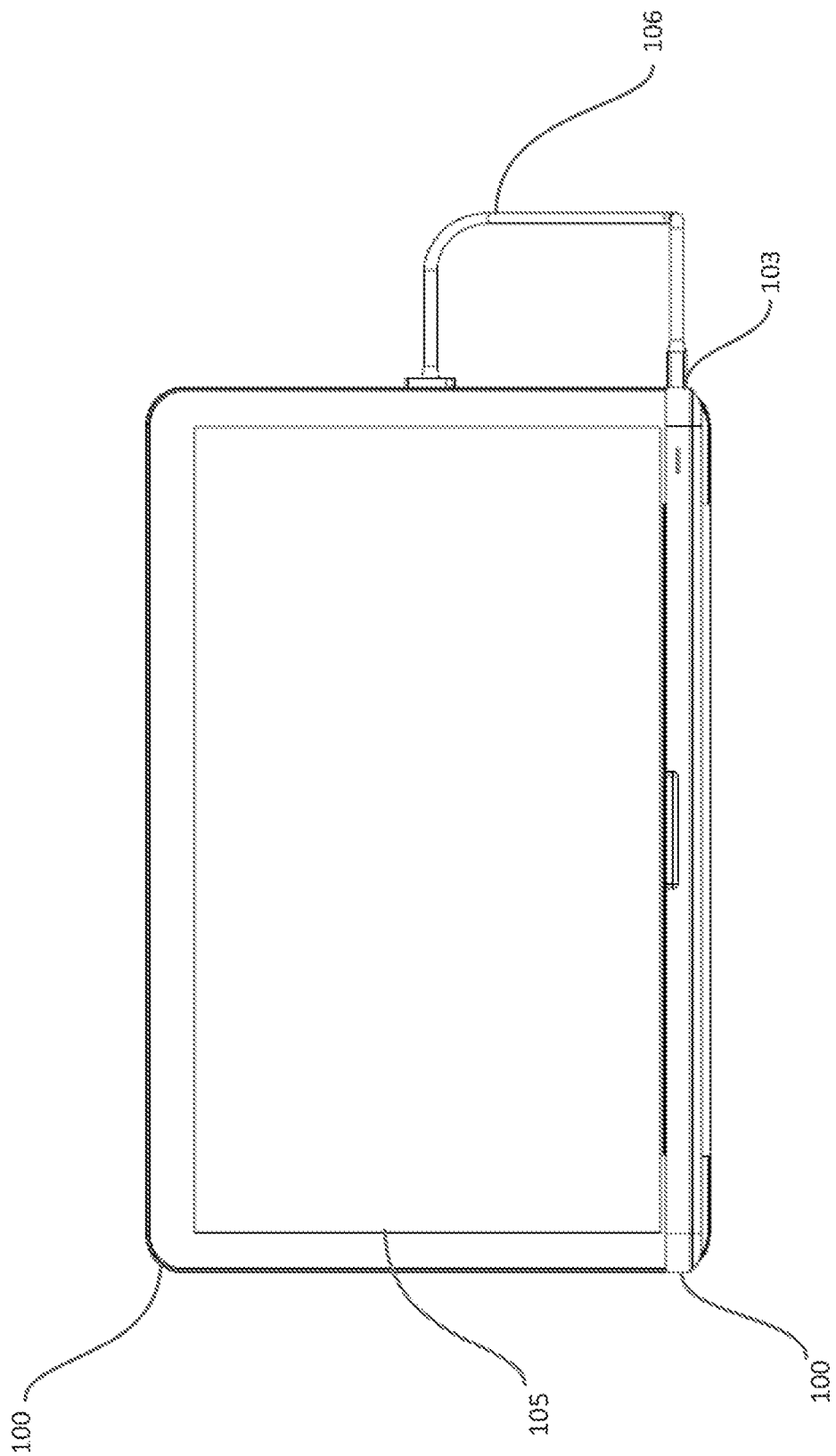
FIG. 1C illustrates a front view of the auxiliary display system in the closed configuration according to an embodiment.

FIG. 1B illustrates a back view of the laptop computer 100 in combination with the auxiliary monitor 102 in a closed position according to an embodiment. FIG. 1C illustrates a front view of the laptop computer 100 in combination with the auxiliary monitor 102 (not visible) in a closed position according to an embodiment. The laptop computer 100 includes a primary screen 105 configured to display output information to a user. FIG. 1D illustrates a side view of the laptop computer 100 in combination with the auxiliary monitor 102 in a closed position according to an embodiment.

As illustrated by the embodiment shown in FIGS. 1B and 1C, the diagonal screen measurement of the auxiliary monitor 102 is smaller than the diagonal screen measurement of the primary screen 105. The addition of the auxiliary monitor 102 therefore does not increase the footprint of the area of the laptop computer 100. Accordingly, when viewed from the perspective of FIG. 1C, the area of the primary screen 105 is not affected by the auxiliary monitor 102. As illustrated by FIG. 1D, the thickness of the auxiliary monitor 102 adds a relatively small increase in total thickness when coupled with the laptop computer 100.

For example, in some embodiments, the auxiliary monitor 102 may have a thickness of approximately 0.34". The diagonal screen measurement of the display portion 108 may be selected according to the diagonal screen measurement of the laptop computer 100 display screen. For example, for a laptop computer screen having a diagonal screen measurement of approximately 13.3", the display portion 108 may have a diagonal screen measurement of approximately 12.5" in some embodiments. It is to be appreciated that the display portion 108 may be manufactured with any diagonal screen measurement desired, and no limitation is meant to be implied by the foregoing values. For example, the display portion 108 could have a diagonal screen measurement which is larger than a diagonal screen measurement of a screen of the laptop computer to which the display portion 108 is attached.

Figure 2A:
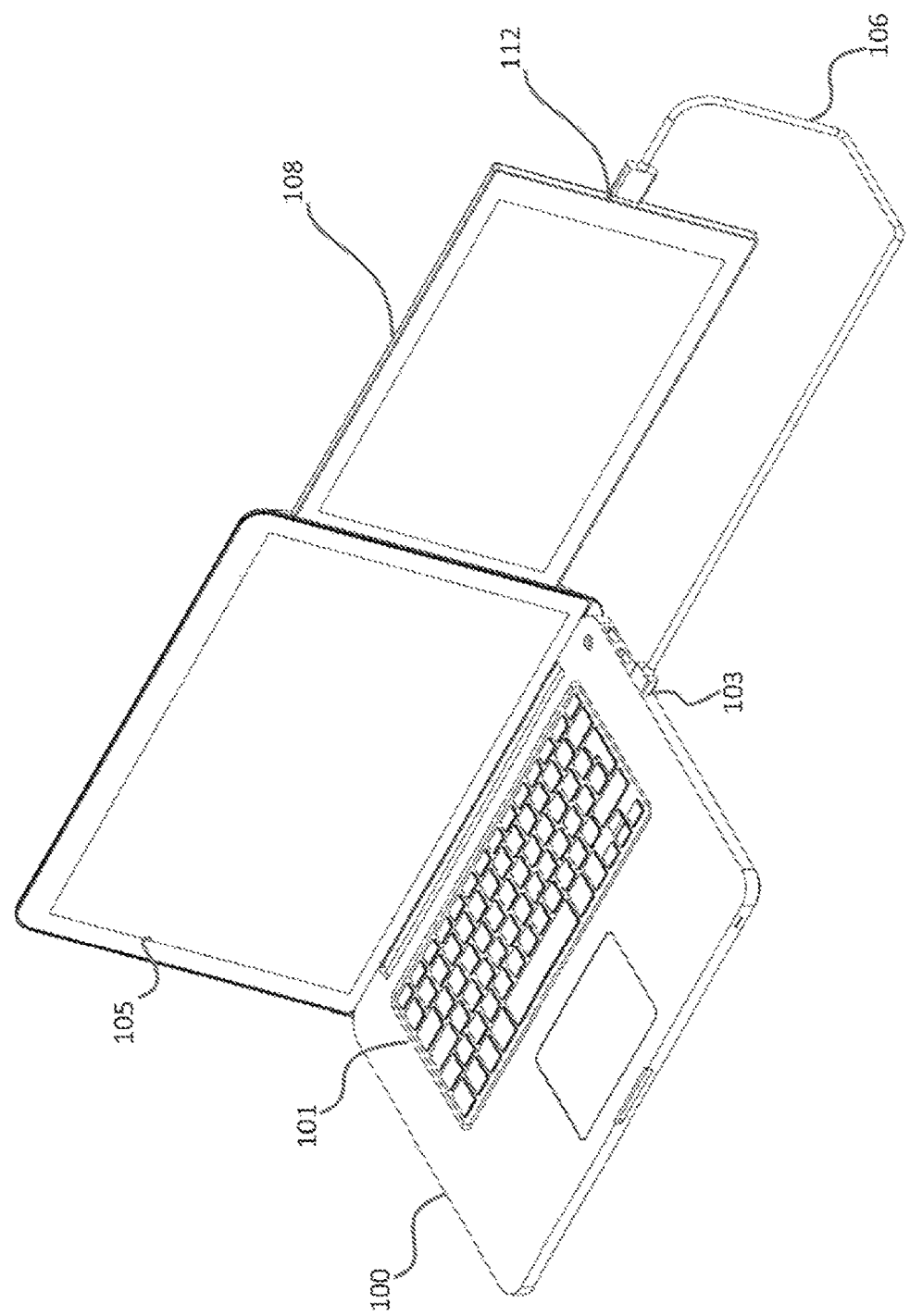
FIG. 2A illustrates a front perspective view of the auxiliary display system in an open configuration according to an embodiment.

FIG. 2A illustrates a perspective view of the laptop computer 100 in combination with the auxiliary monitor 102 in an "open position" according to an embodiment. According to at least one example, the auxiliary monitor 102 is in an open position when the display portion 108 is at least partially visible to at least one user. For example, the auxiliary monitor 102 may be at least partially visible when the display portion 108 is slid at least partially out from behind the primary screen 105.

Figure 2B:
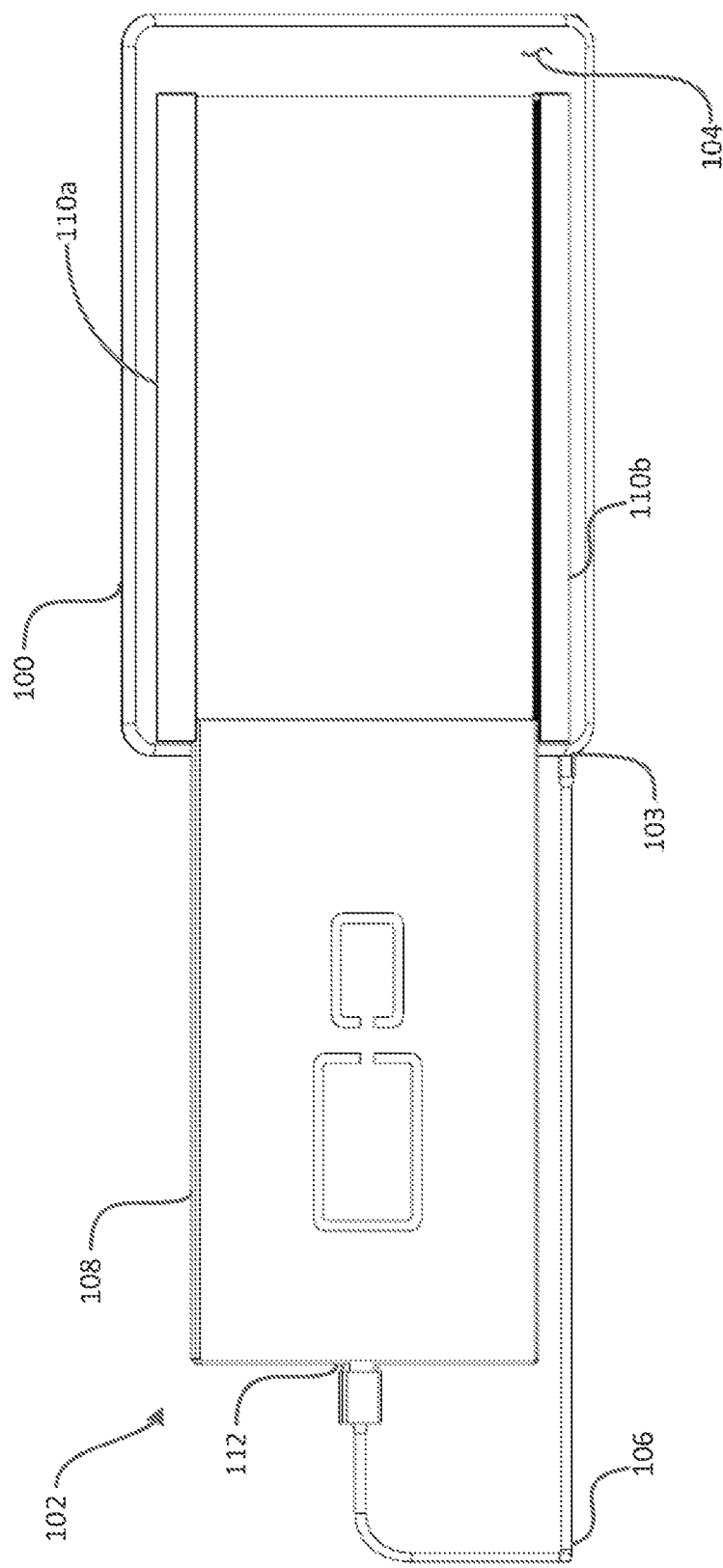
FIG. 2B illustrates a back view of the auxiliary display system in the open configuration according to an embodiment.

FIG. 2B illustrates a back view of the laptop computer 100 in combination with the auxiliary monitor 102 in an open position according to an embodiment. The display portion 108 may be considered to be in a "fully open" position, as defined by the display portion 108 being fully extended in one dimension along the rails 110a, 110b. Stated differently, the display portion 108 is in a fully open position when the display portion 108 is incapable of being slid any further along the rails 110a, 110b in one direction. In some embodiments, the display portion 108 may be considered to be in a "partially open" position when the display portion 108 is between a closed position and a fully open position and is capable of further extension and retraction in at least one direction.

The auxiliary monitor 102 may be configured to enter a sleep state responsive to determining that the auxiliary monitor 102 is in a particular position. The sleep state may include, for example, implementing a reduced set of functionality, disabling the display portion 108 from receiving or displaying information, and so forth. For example, the auxiliary monitor 102 may be configured to enter the sleep state and disable the display portion 108 from displaying information responsive to determining that the display portion 108 is in a closed position, and may be configured to re-enable the display portion 108 to display information responsive to determining that the display portion 108 has been slid into one of a partially open position and a fully open position.

Figure 3:
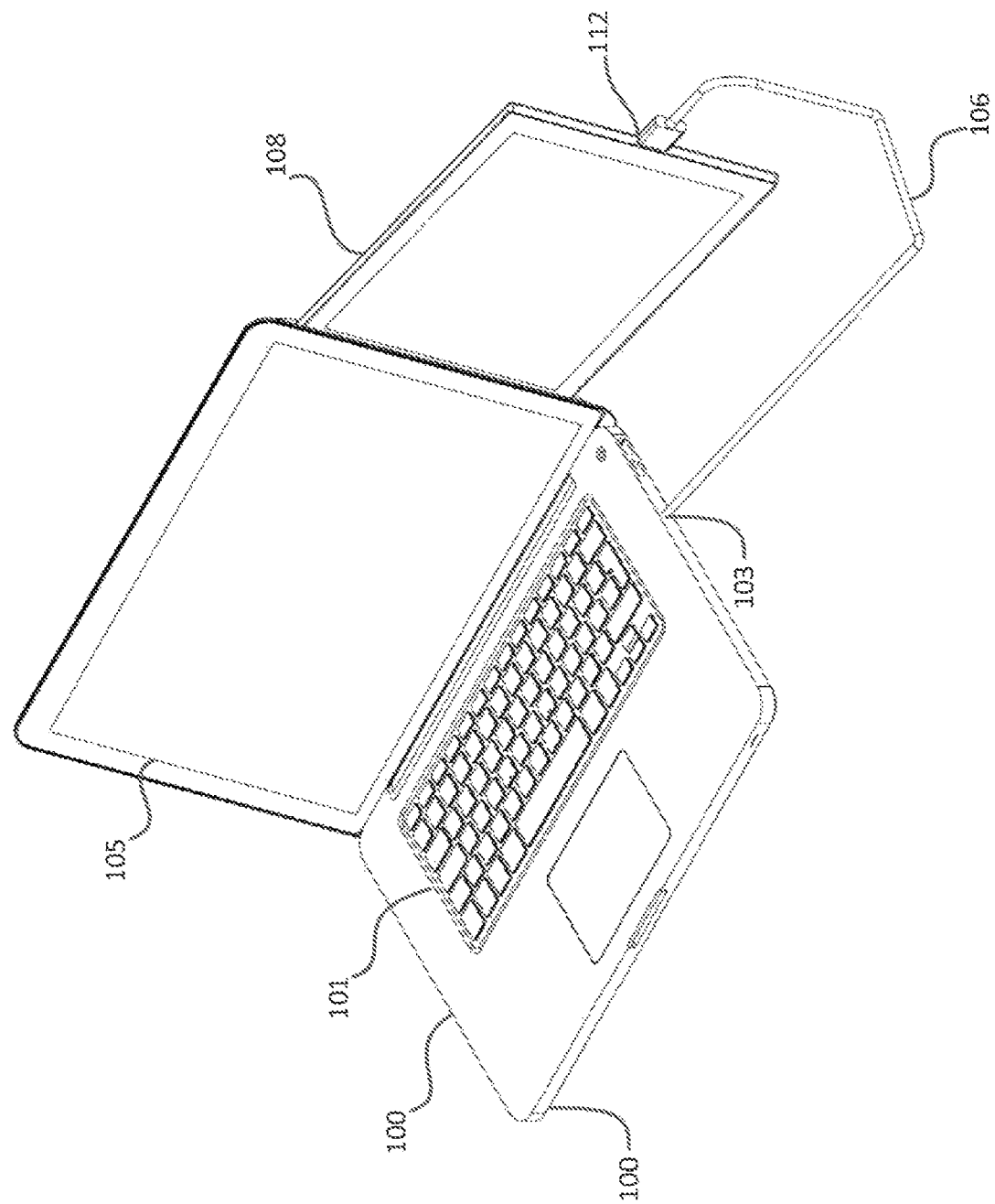
FIG. 3 illustrates a front perspective view of the auxiliary display system according to an embodiment.

FIG. 3 illustrates a perspective view of the laptop computer 100 in combination with the auxiliary monitor 102 in an open, "non-parallel" configuration according to an embodiment. According to at least one example, the auxiliary monitor 102 is in a non-parallel configuration when the display portion 108 is rotated to an orientation that is not parallel or antiparallel to the screen of the laptop computer 100. In at least one example, the auxiliary monitor 102 is in a parallel configuration when the display portion 108 is not rotated relative to the closed position, and is parallel to the primary screen 105.

In some embodiments, the display portion 108 may be rotated approximately 90° relative to the parallel configuration towards the primary screen 105. The display portion 108 may be rotated approximately 180° relative to the parallel configuration away from the primary screen 105 such that the display portion 108 is antiparallel to the primary screen 105. In some embodiments, the auxiliary monitor 102 is considered to be in a "tabletized" configuration when the display portion 108 is antiparallel to the primary screen 105.

Figure 4A:
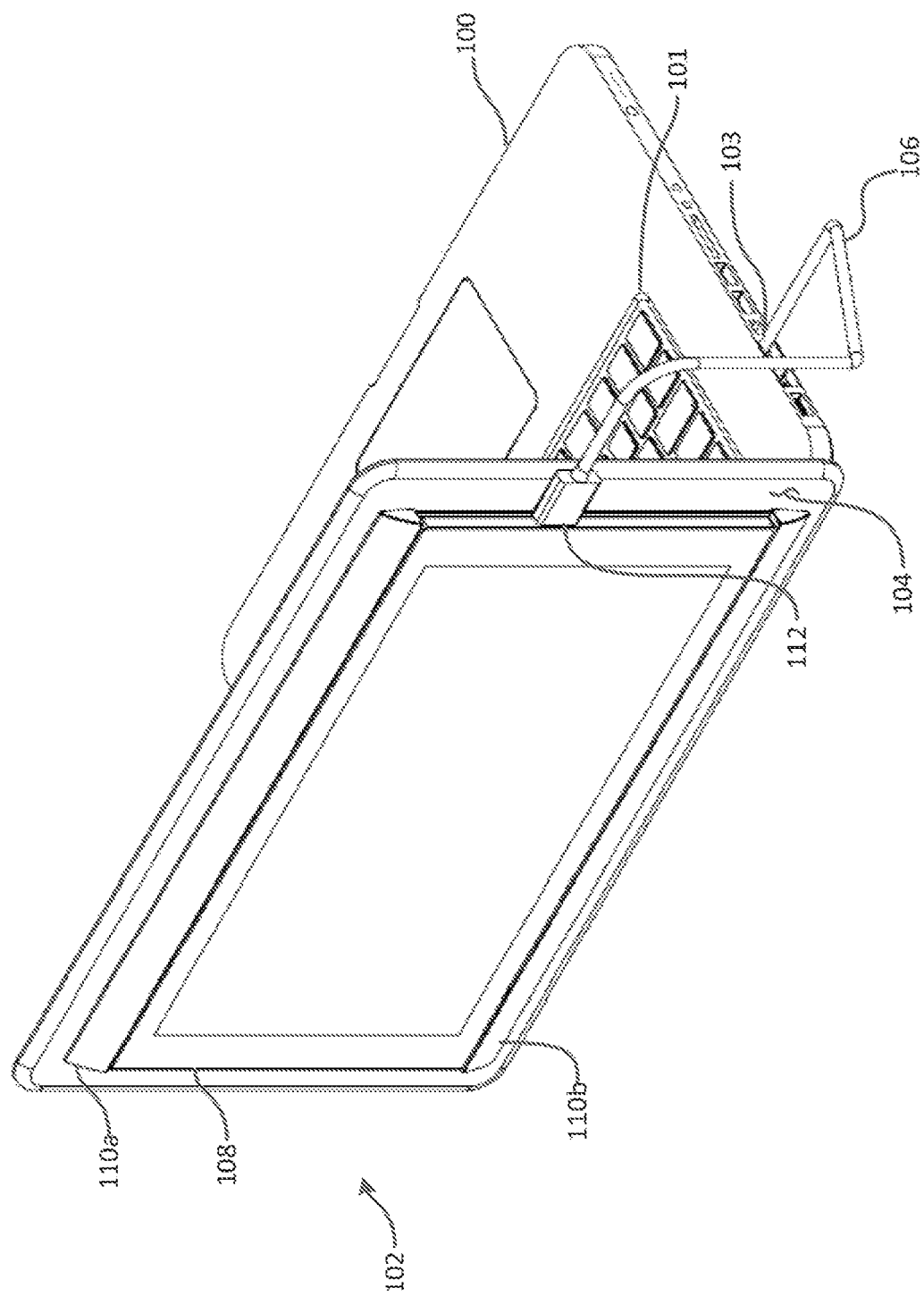
FIG. 4A illustrates a back perspective view of an auxiliary monitor in a tabletized configuration according to an embodiment.
Figure 4B:
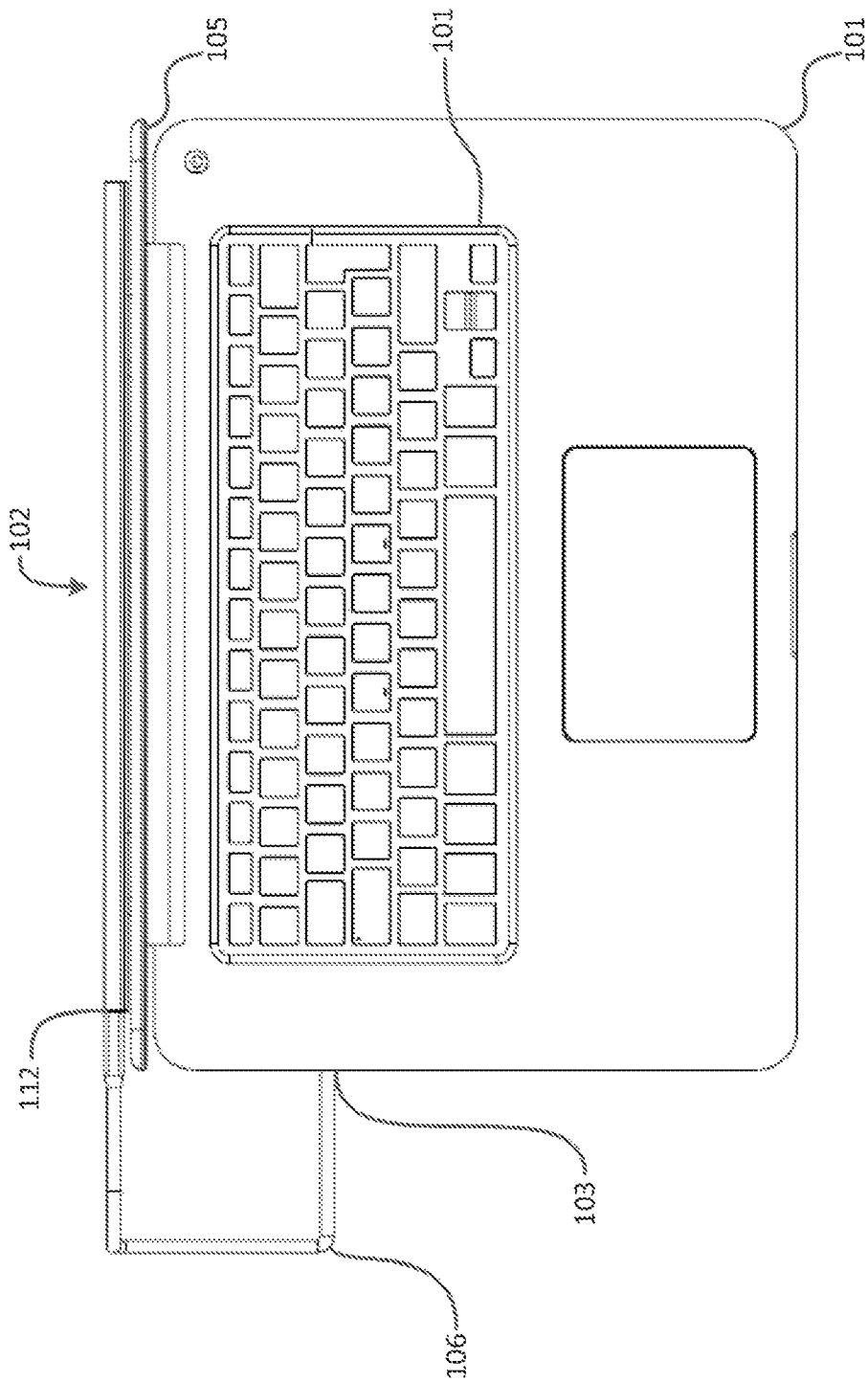
FIG. 4B illustrates a top view of the auxiliary monitor in the tabletized configuration according to an embodiment.

FIG. 4A illustrates a back perspective view of the laptop computer 100 in combination with the auxiliary monitor 102 in the tabletized configuration according to an embodiment. FIG. 4B illustrates a top view of the laptop computer 100 in combination with the auxiliary monitor 102 in a tabletized configuration according to another embodiment. In some embodiments, the auxiliary monitor 102 is flush with the rails 110a, 110b in the tabletized configuration (i.e., the rails 110a, 110b and the display portion 108 extend from the backplane 104 by equal distances).

As illustrated by FIGS. 4A and 4B, the display portion 108 is antiparallel with the primary screen 105 in the tabletized configuration. The tabletized configuration may be considered particularly advantageous in various situations, including situations in which the auxiliary monitor 102 is used in a manner similar to a tablet computer. In at least one embodiment, the functionality of the auxiliary monitor 102 does not change regardless of the orientation of the display portion 108. The auxiliary monitor 102 may be capable of receiving input information (for example, from a stylus) and providing output information (for example, displaying a video) in any configuration and orientation. However, users may consider the tabletized configuration to be more advantageous than other configurations for certain tasks, such as writing on the display portion 108 with a stylus, because the tabletized configuration provides an ergonomic and stable working surface for users.

Although FIGS. 4A and 4B illustrate the laptop computer 100 as being in an open configuration (i.e., a configuration in which the primary screen 105 is not anti-parallel with the keyboard portion 101), the auxiliary monitor 102 may also operate in the tabletized configuration when the laptop computer is in a closed configuration (i.e., a configuration in which the primary screen 105 is anti-parallel with the keyboard portion 101).

The laptop computer 100 may be configured to enter a sleep state responsive to detecting that the laptop computer is in a closed configuration. In some embodiments, the laptop computer 100 is configured to implement a reduced set of functionality in the sleep state. In other embodiments, the laptop computer 100 may disable the primary screen 105 from displaying output information in the sleep state. The auxiliary monitor 102 may be capable of operating normally by receiving input information and displaying output information even when the laptop computer 100 is in a sleep state.

Figure 5:
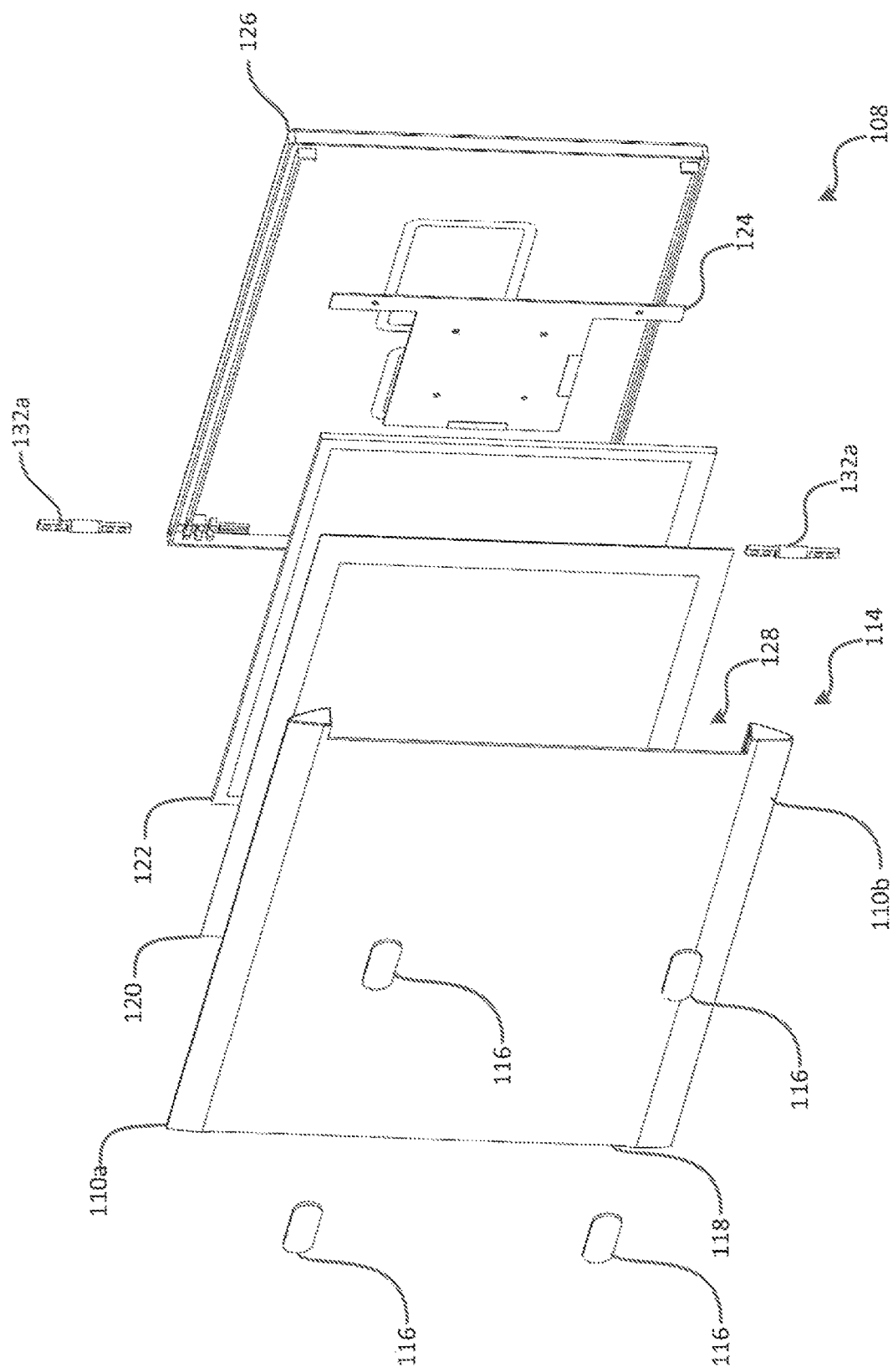
FIG. 5 illustrates an exploded view of the auxiliary monitor according to an embodiment.

The auxiliary monitor 102 will now be described in greater detail with respect to FIGS. 5-7. FIG. 5 illustrates an exploded view of the auxiliary monitor 102 according to an embodiment. The auxiliary monitor 102 generally includes a mounting portion 114, and the display portion 108. The mounting portion 114 includes coupling elements 116 and a mount 118. The display portion 108 includes a front cover 120, a display screen 122, a Printed Circuit Board (PCB) 124, and a back cover 126. In some embodiments, the front cover 120 and the display screen 122 may comprise a single entity, and are identified as separate elements for explanatory purposes only.

The coupling elements 116 are configured to couple the auxiliary monitor 102 to the laptop computer 100, as discussed in greater detail below. The mount 118 is configured to be slidably and rotatably coupled to the display portion 108, as discussed in greater detail below. The front cover 120 and the back cover 126 are configured to encapsulate the display screen 122 to prevent damage to, and displacement of, the display screen 122. The front cover 120 may be constructed of a conductive material that enables a touch input on a first side of the front cover 120 to be sensed by the display screen 122 on the second side of the front cover 120. For example, the front cover 120 may be constructed of a conductive glass material.

The display screen 122 is configured to receive input information, such as touch inputs, and provide output information, such as a video display, as discussed in greater detail below. The display screen 122 may also be configured to receive one or more control signals from the PCB 124. The PCB 124 may be configured to communicate one or more control signals to the display screen 122 depending on a position, orientation, or configuration of the display portion 108. For example, the PCB 124 may communicate a sleep signal to the display screen 122 responsive to determining that the display portion 108 is in a closed position.

In some embodiments, the PCB 124 may be further configured to communicate one or more control signals to the laptop computer 100. For example, the PCB 124 may be configured to receive a first set of one or more signals indicative of a touch input on the display screen 122, and communicate a second set of one or more signals (for example, derived from the first set of one or more signals) to the laptop computer 100.

As discussed above, the back cover 126 is configured to prevent damage to, and displacement of, the display screen 122. The back cover 126 is also configured to interface with the mount 118 to allow the display portion 108 to be slidably connected to the mount 118, as discussed in greater detail below.

The coupling elements 116 will now be described in greater detail. As discussed above, the coupling elements 116 are configured to connect the auxiliary monitor 102 to the laptop computer 100. For example, the coupling elements 116 may be adhesive magnets having an adhesive side and a magnetic side. For example, the adhesive side may include a chemical substance which binds one or more objects together and resists the objects' physical separation, such as glue. The adhesive side may be coupled to the mount 118, and the magnetic side may be configured to be coupled with a corresponding magnetic surface. For example, the laptop computer 100 may be coupled to one or more adhesive magnets each having an adhesive side coupled to the laptop computer 100, and a magnetic side configured to be coupled to a corresponding coupling element of the coupling elements 116.

The implementation of adhesive magnets for the coupling elements 116 allows the auxiliary monitor 102 to be removably coupled to the laptop computer 100. The magnetic strength of the magnets may be selected such that the auxiliary monitor 102 does not become inadvertently decoupled from the laptop computer 100, while allowing a user to decouple the auxiliary monitor 102 from the laptop computer 100 by pulling the auxiliary monitor 102 apart from the laptop computer 100.

In other embodiments, the coupling elements 116 may not be adhesive magnets. For example, the coupling elements 116 may each have an adhesive side and a hook-and-loop side to enable the auxiliary monitor 102 to be removably coupled to the laptop computer 100. In other examples, both sides of the coupling elements 116 may be adhesive. In other examples, one or both of the sides may include adhesives, magnets, hook, loop, snap fasteners, clips, interference-fit connectors, rails, protrusions, openings, or any other device, component, or material to enable a physical connection, which may be removable or, in some examples, non-removable. In still other embodiments, the coupling elements 116 may include two or more of the foregoing examples. It is to be appreciated that, although four coupling elements 116 are illustrated, any number of coupling elements may be implemented in other embodiments.

The mount 118 will now be discussed in greater detail. The mount 118 includes the first rail 110a, the second rail 110b, and a notch 128. As discussed above, the first rail 110a and the second rail 110b are configured to be coupled to the display portion 108 to allow the display portion 108 to slide relative to the mount 118. The notch 128 is a cut-away from the mount 118 to provide the display portion 108 with any clearance necessary to rotate freely. For example, the notch 128 may be as long or longer than the length of the display portion 108 and as wide or wider than the thickness of the display portion 108.

Figure 6:
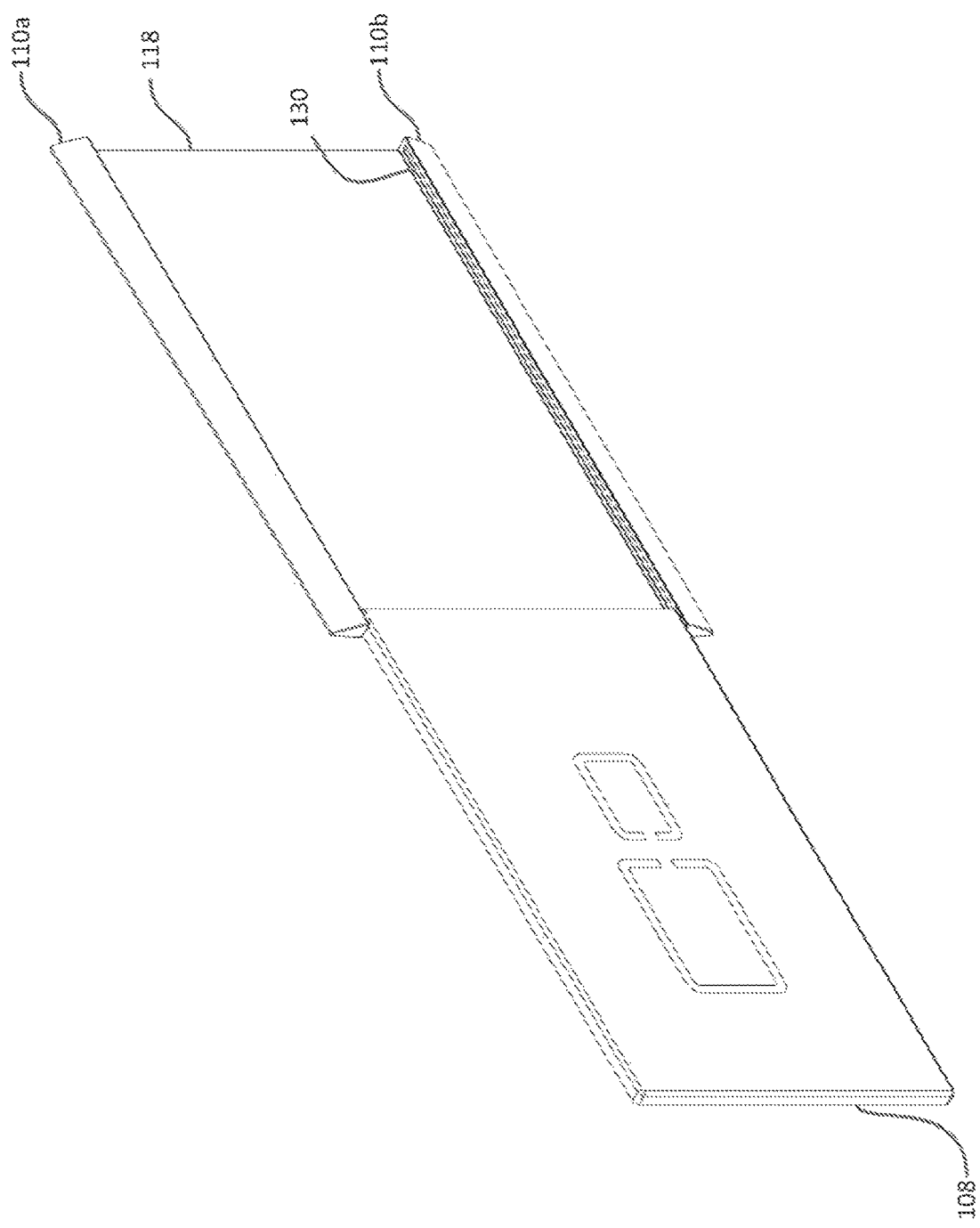
FIG. 6 illustrates a back perspective view of the auxiliary monitor according to an embodiment.

FIG. 6 illustrates the auxiliary monitor 102 from a back perspective view according to an embodiment. As illustrated by FIG. 6, the mount 118 includes a groove 130 in the second rail 110b to slidably couple with the display portion 108. For example, the display portion 108 may include a protrusion configured to protrude into, and slide along, the groove 130. In some embodiments, the first rail 110a may include a similar groove (not illustrated) configured to slidably couple with a second protrusion of the display portion 108.

The display screen 122 will now be discussed in greater detail. The display screen 122 may be configured to receive input information and provide output information. For example, in some embodiments, the display screen 122 may be implemented as a tablet computer. To receive input information, the display screen 122 may include a touch-sensitive surface configured to respond to touch inputs from a user's finger, a stylus, and so forth. For example, as discussed above, the front cover 120 may be part of the display screen 122 and may act as a touch-sensitive surface for the display screen 122. To provide output information, the display screen 122 may display information to a user, similar to a computer monitor.

The display screen 122 may also include a wired or wireless communications interface to exchange information with one or more computers. For example, the display screen 122 may include a communications interface to exchange information with the laptop computer 100, such information provided by the laptop computer 100 indicating display information to be output by the display portion 108.

In at least one embodiment, a wired communications interface is embodied by the wired communications port 112. The wired communications port 112 enables the display screen 122 to exchange information with the laptop computer 100 via the wired connection 106. In some embodiments, the display screen 122 may include a wireless communications interface instead of, or in addition to, the wired communication interface. For example, the display screen 122 may include a wireless communications interface configured to enable wireless communication with the laptop computer 100.

In some embodiments, the display screen 122 may include a controller. The controller may be configured to generate one or more control signals to control operation of the display screen 122. For example, the controller may generate one or more control signals to display output information on the display screen 122 in response to input information received by the display screen 122 from, for example, the PCB 124. In some embodiments, the controller operates in conjunction with the laptop computer 100. In other embodiments, the controller operates without communicating with the laptop computer 100. In still other embodiments, the display screen 122 may not include a controller, and may instead receive control signals solely from at least one of the laptop computer 100 and the PCB 124.

The back cover 126 will now be discussed in greater detail. The back cover 126 is configured to be coupled to the display screen 122, and includes a first hinge 132a and a second hinge 132b configured to couple to the mount 118. The hinges 132a, 132b may be configured to protrude into the rails 110a, 110b, respectively, of the mount 118. In some embodiments, the hinges 132a, 132b may be configured to slide in direct contact with the rails 110a, 110b.

Figure 7:
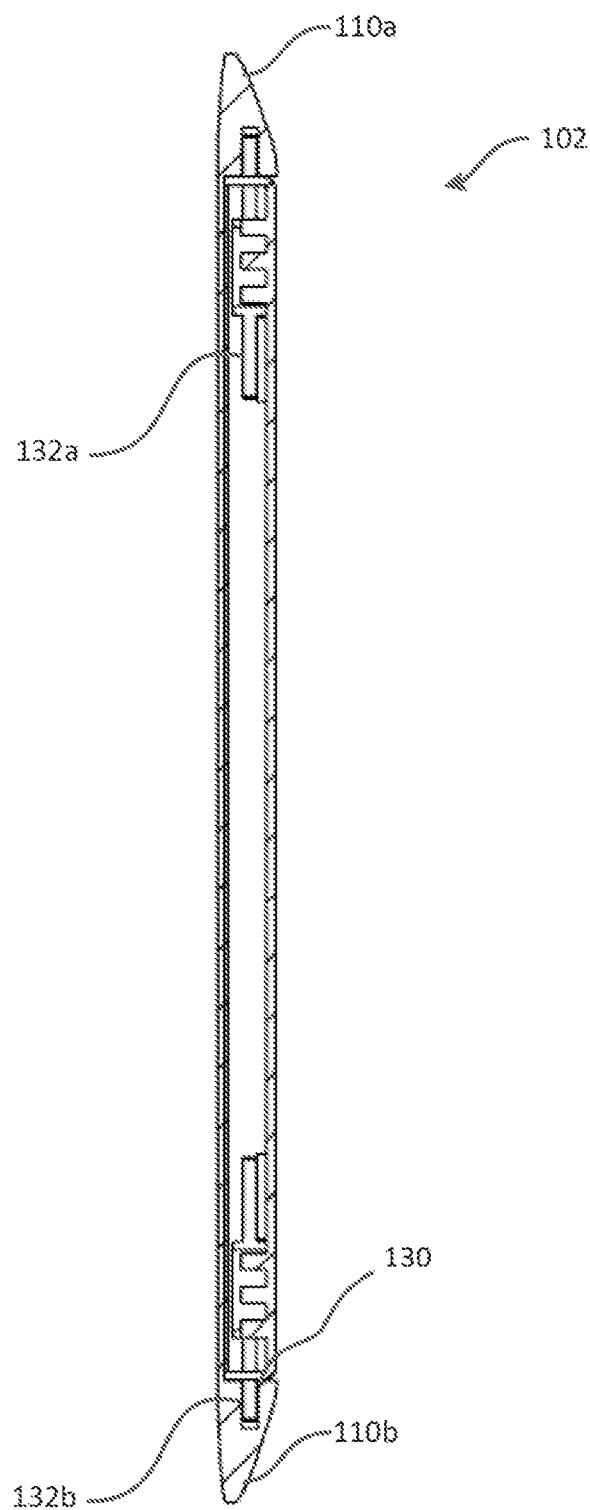
FIG. 7 illustrates a cross-sectional view of the auxiliary monitor according to an embodiment.

FIG. 7 illustrates a side cross-sectional view of the auxiliary monitor 102 according to an embodiment. The second hinge 134b may protrude into the groove 130 of the second rail 110b, and the first hinge 134a may protrude into a similar groove in the first rail 110a. The hinges 132a, 132b may be configured such that, when the display portion 108 is in a fully open position (i.e., the display portion 108 is slid as much as possible in one direction), the display portion 108 is capable of being rotated about the hinges 132a, 132b to a desired orientation.

Alternative coupling mechanisms between the back cover 126 and the mount 118 are intended to be within the scope of this disclosure. Although the foregoing description notes that the hinges 132a, 132b may be configured to slide in direct contact with the rails 110a, 110b, in alternate embodiments, other sliding mechanisms may be implemented. For example, ball bearings may be implemented to facilitate sliding between the hinges 132a, 132b and the rails 110a, 110b. In still other examples, roller mechanisms may be implemented to facilitate sliding between the hinges 132a, 132b and the rails 110a, 110b. As discussed in greater detail below, in alternate embodiments, alternate implementations of the hinges 132a, 132b and the rails 110a, 110b may be within the scope of this disclosure.

An auxiliary monitor has been disclosed. The auxiliary monitor is capable of receiving input information from a user and providing output information to a user. The auxiliary monitor increases the physical footprint of an associated laptop computer by a marginal amount, while providing significant benefits in the amount of information that can be exchanged between the user and the combination of the laptop computer and the auxiliary monitor. The auxiliary monitor also expands the functionality of the laptop computer, such as by allowing the auxiliary monitor to be used in a similar manner as a tablet computer.

No limitation of the auxiliary monitor is meant to be implied by the word "auxiliary." The auxiliary monitor may be used even when the laptop computer is in an idle or sleep mode such that the auxiliary monitor is the only active monitor. For example, the laptop computer may be closed while the user continues to use the auxiliary monitor. Furthermore, no limitation is meant to be implied by the word "monitor." Although some embodiments of the auxiliary monitor are capable of displaying output information, some embodiments of the auxiliary monitor are also capable of receiving input information from a user, such as via touch inputs. In alternate embodiments, the auxiliary monitor is only capable of displaying information to a user, and receiving information the laptop computer, but incapable of receiving touch inputs from a user.

The auxiliary monitor may be any size and may have any desired dimensions. Although some of the foregoing embodiments illustrate the auxiliary monitor as having a smaller screen area than that of the corresponding laptop computer, in alternate embodiments, the auxiliary monitor may have a screen area that is larger than that of the corresponding laptop computer.

In some embodiments, the auxiliary monitor is communicatively coupled to the laptop computer via a wired connection. In some implementations, a user may desire the wired connection to be on one side or the other of the laptop computer. To reverse the auxiliary monitor, the auxiliary monitor can be decoupled from the backplane of the laptop computer, rotated 180° about a vector normal to the backplane of the laptop computer, and re-coupled to the backplane of the laptop computer, effectively moving the wired connection between the left and right sides of the laptop computer for ease of use by a user.

As discussed above, an auxiliary monitor may be slidably and rotatably coupled to a mount coupled to a primary display. For example, the auxiliary monitor may be able to slide relative to the mount along at least one rail, and may be able to rotate relative to the mount about at least one hinge. One embodiment is discussed above with respect to the hinges 132a, 132b and the rails 110a, 110b.

Figure 8:
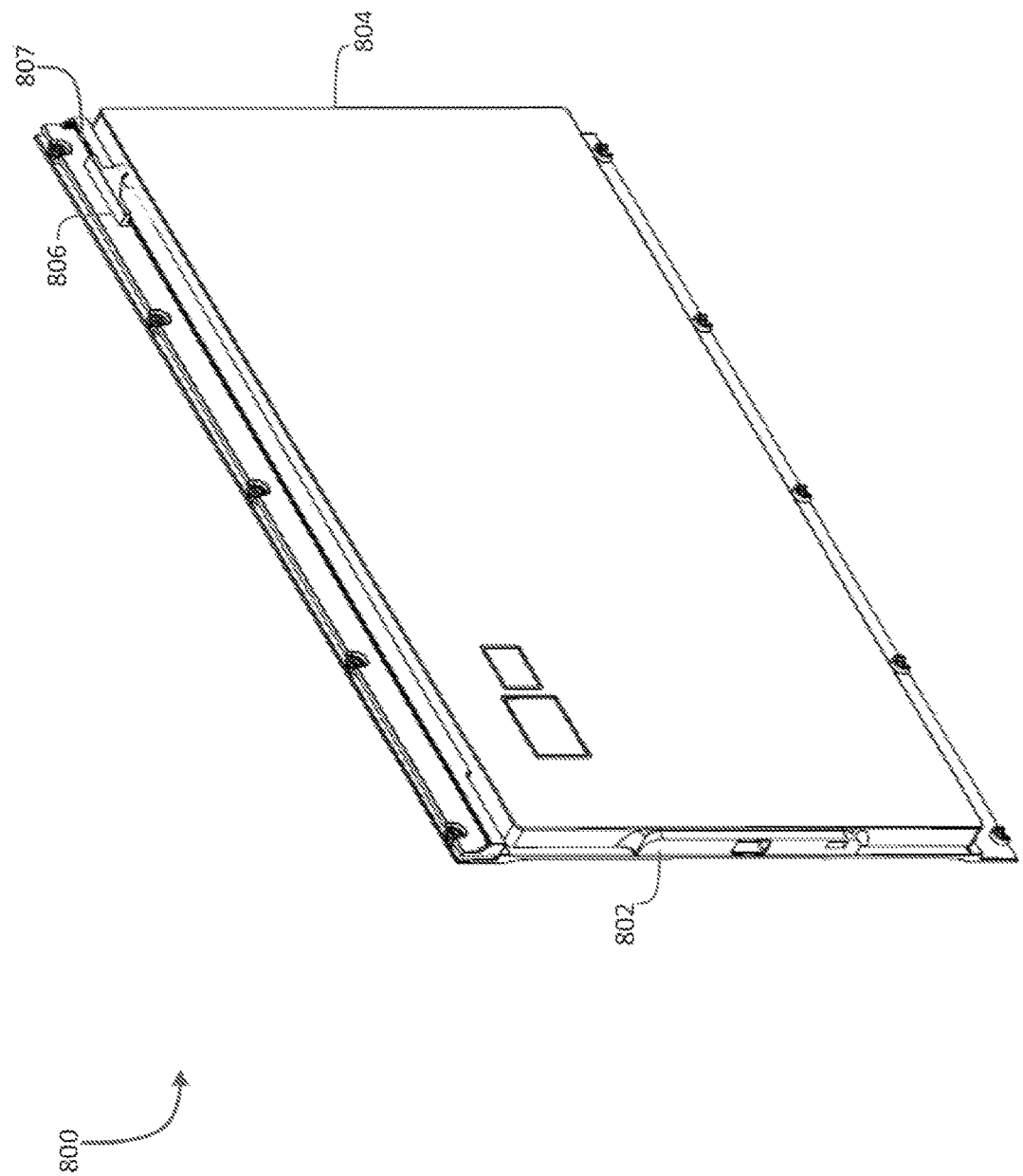
FIG. 8 illustrates a perspective view of an auxiliary monitor according to an embodiment.

FIG. 8 illustrates a perspective view of an auxiliary display system 800 according to another embodiment. The auxiliary display system 800 includes a mount 802, an auxiliary display 804, and a hinge assembly 806. The mount 802 is configured to be coupled to a primary surface, such as a backplane of a laptop computer, and is configured to be slidably coupled to the hinge assembly 806. The auxiliary display 804 is configured to be coupled to the hinge assembly 806. The hinge assembly 806 is configured to be slidably and rotatably coupled to the mount 802. For example, and as discussed in greater detail below, the mount 802 may include a track 807 configured to engage with the hinge assembly 806.

An embodiment of the hinge assembly 806 will now be discussed with respect to FIGS. 9A-9C. FIG. 9A is a side view of the hinge assembly 806 according to an embodiment. FIG. 9B is a front view of the hinge assembly 806 according to an embodiment. FIG. 9C is a perspective view of the hinge assembly 806 according to an embodiment.

The hinge assembly 806 includes a carriage head 808, a carriage head mount 810, and a mounting block 812. The carriage head 808 is configured to be slidably coupled to a mount, such as the mount 802. For example, the carriage head 808 may be configured to be coupled to the track 807 of the mount 802. More specifically, a protrusion 809 of the carriage head 808 may be configured to protrude into the track 807, as discussed in greater detail below.

The carriage head mount 810 is configured to be coupled to the carriage head 808, and is configured to be rotatably coupled to the mounting block 812. For example, and with reference to FIG. 9A, the carriage head mount 810 may be configured to rotate about the Y-axis. The mounting block 812 is configured to be rotatably coupled to the carriage head mount 810, and is configured to be coupled to a display portion. For example, the mounting block 812 may be configured to be coupled to the auxiliary display 804. In some embodiments, in which the mounting block 812 is coupled to the auxiliary display 804, the carriage head 808 and the carriage head mount 810 may enable the auxiliary display 804 to be slidably and rotatably coupled, respectively, to the mount 802.

In at least one embodiment, the carriage head 808 may be configured to engage the track 807 at four points of contact identified below. Maximizing a number of points of contact between the carriage head 808 and the track 807 may distribute mechanical stress across a greater area of the carriage head 808 and the track 807, thereby decreasing an amount of mechanical stress placed on any one point of either the carriage head 808 or the track 807. Decreasing the amount of mechanical stress placed on any one point of either the carriage head 808 or the track 807 may increase the longevity of the carriage head 808 and/or the track 807.

For example, and with reference to FIG. 9C, the carriage head 808 includes a first side 816, a second side 818, a third side 820, a fourth side 822, a fifth side 824, a sixth side 826, and a stem portion 828. The first side 816 is perpendicularly connected to the second side 818 at a first vertex, and is perpendicularly connected to the sixth side 826 at a second vertex. The second side 818 is perpendicularly connected to the first side 816 at a first vertex, and is perpendicularly connected to the third side 820 at a second vertex. The third side 820 is perpendicularly connected to the second side 818 at a first vertex, and is perpendicularly connected to the fourth side 822 at a second vertex.

The fourth side 822 is perpendicularly connected to the third side 820 at a first vertex, and is perpendicularly connected to the fifth side 824 at a second vertex. The fifth side 824 is perpendicularly connected to the fourth side 822 at a first vertex, and is perpendicularly coupled to the sixth side 826 at a second vertex. The sixth side 826 is perpendicularly connected to the first side 816 at a first vertex, and is perpendicularly coupled to the fifth side 824 at a second vertex. The stem portion 828 is coupled to, and extends from, the fifth side 824.

Figure 10:
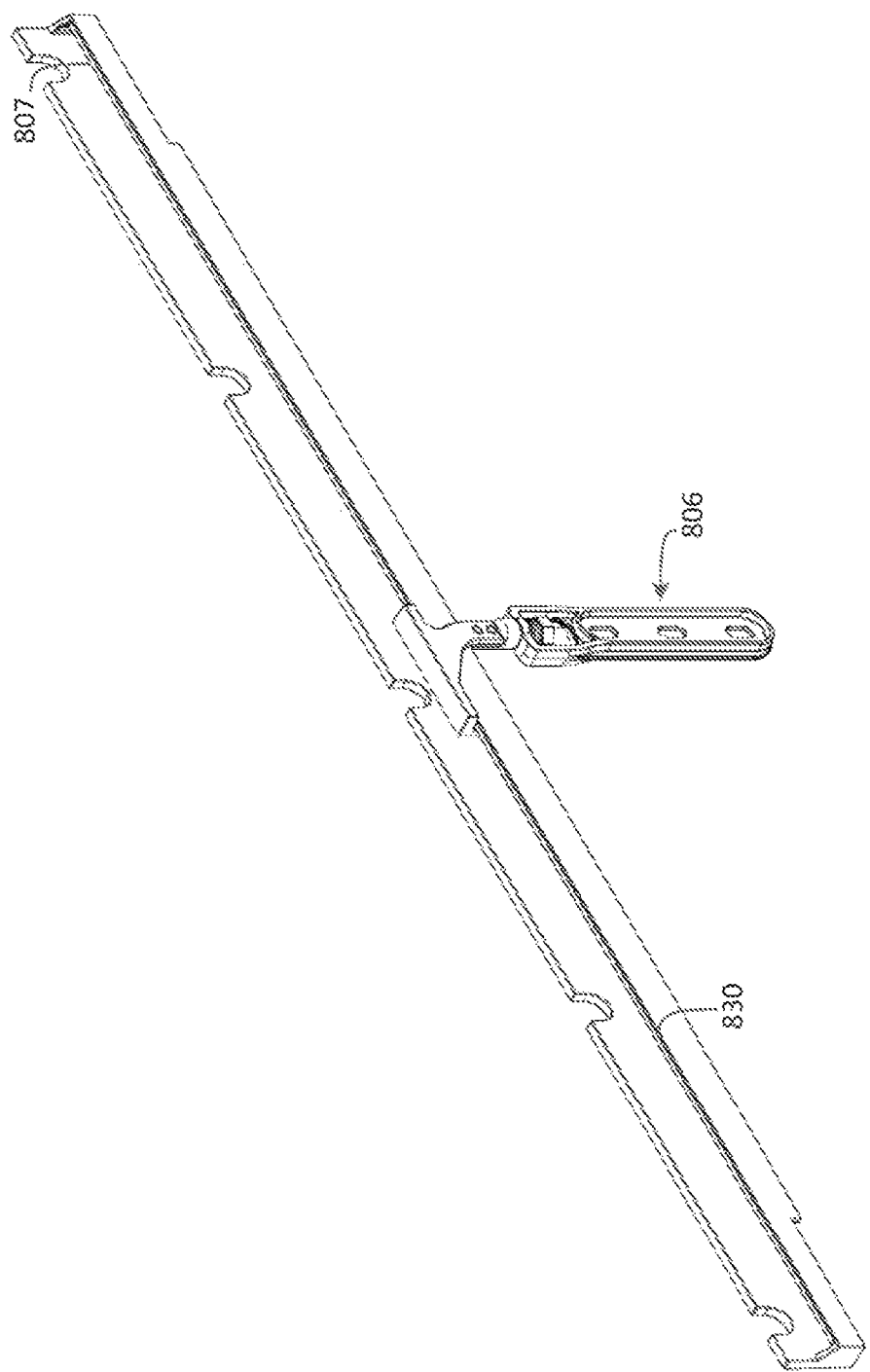
FIG. 10 illustrates a perspective view of the hinge assembly in connection with a track according to an embodiment.

As discussed above, in at least one embodiment, the carriage head 808 is configured to engage the track 807 at four points of contact. FIG. 10 illustrates a perspective view of the hinge assembly 806 coupled to the track 807 according to an embodiment. For clarity of illustration, the sides 816-826 are not labeled. As illustrated by FIG. 10, the carriage head 808 of the hinge assembly 806 is configured to contact the track 807 at the first side 816, the second side 818, the third side 820, and the fourth side 822. The protrusion 809 of the carriage head 808 formed by the first side 816, the second side 818, and the third side 820 is configured to protrude into the track 807. The fourth side 822 of the carriage head 808 contacts a top surface 830 of the track 807.

Figure 11:
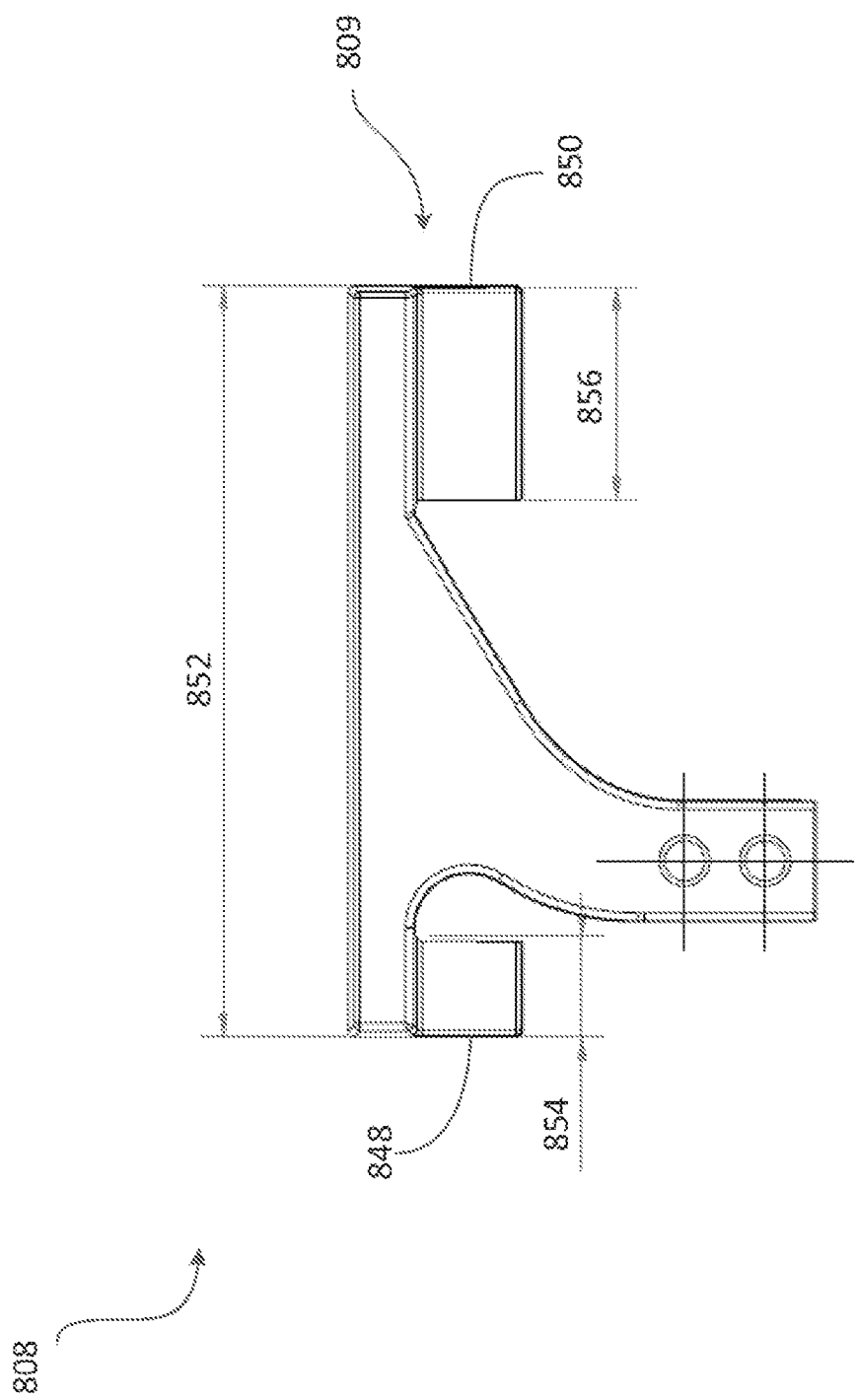
FIG. 11 illustrates a side view of the hinge assembly according to an embodiment.

FIG. 11 illustrates a side view of a portion of the carriage head 808 according to an embodiment. The carriage head 808 includes the protrusion 809. The protrusion 809 includes a first track engagement member 848 and a second track engagement member 850. The protrusion 809 has a length measurement 852, the first track engagement member 848 has a length measurement 854, and the second track engagement member 850 has a length measurement 856.

In one embodiment, the first track engagement member 848 may be spaced apart from the second track engagement member 850. For example, the length measurement 852 of the protrusion 809 may be approximately 1.10 inches, the length measurement 854 of the first track engagement member 848 may be approximately 0.15 inches, and the length measurement 856 of the second track engagement member 850 may be approximately 0.31 inches. Accordingly, a space of approximately 0.64 inches may exist between the first track engagement member 848 and the second tack engagement member 850.

In at least one embodiment, the protrusion 809 is configured having a length sufficient to satisfy at least two functions. First, in some embodiments, the auxiliary display system 800 may include two tracks (for example, similar to the track 807) attached to the mount 802. For example, the auxiliary display system 800 may include a track at a top side of the mount 802 and a bottom side of the mount 802, each of which is configured to be coupled to a respective hinge assembly. In some embodiments, it may be advantageous for the two respective hinge assemblies to begin sliding relative to the mount 802 simultaneously, which may be difficult where an engagement length of the respective hinge assemblies are relatively short. Accordingly, a length of the protrusions of the hinge assemblies (for example, the length measurement 852 of the protrusion 809) are selected to be long enough to prevent misalignment of the top and bottom hinge assemblies included in certain embodiments.

Second, in some embodiments, it is to be appreciated that an auxiliary display (for example, the auxiliary display 804) may be fully extended relative to a primary display connected to the auxiliary display via a mount (for example, the mount 802). As the auxiliary display is extended, a moment may be created about an edge of the primary display, where the moment increases as the auxiliary display extends further. It may be advantageous to prevent the auxiliary display from being extended far enough to cause the primary display to tip over about the edge of the primary display. Accordingly, the length of a protrusion (for example, the length measurement 852 of the protrusion 809) may be selected such that the auxiliary display (for example, the auxiliary display 804) does not cause a primary display to tip over due to the moment generated by the auxiliary display.

In some embodiments, it may be advantageous for the auxiliary display 804 to lock into place when fully extended. Locking into place may include a configuration wherein the auxiliary display 804 is not easily slidable about the track 807, but which may be easily unlocked by a user. To provide a locking mechanism in certain embodiments, protrusion the first track engagement member 848 and the second track engagement member 850 may be configured to accommodate a detent. For example, the first track engagement member 848 and the second track engagement member 850 may be positioned to provide a space between the members 848, 850 which may receive the detent. The detent may resist sliding of the auxiliary display 804 relative to the track 807 below a minimum amount of force applied to the auxiliary display 804 in the direction which the auxiliary display 804 is configured to slide. For example, the detent may extend between the protrusion first track engagement member 848 and the second track engagement member 850 when the auxiliary display 804 is fully extended to resist sliding of the auxiliary display 804. However, if a minimum amount of force is applied to the auxiliary display 804 in the direction which the auxiliary display 804 is configured to slide, at least one of the first track engagement member 848 and the second track engagement member 850 is configured to exert a force on the detent to remove the detent from the space between the members 848, 850, thereby unlocking the auxiliary display 804.

Figure 12:
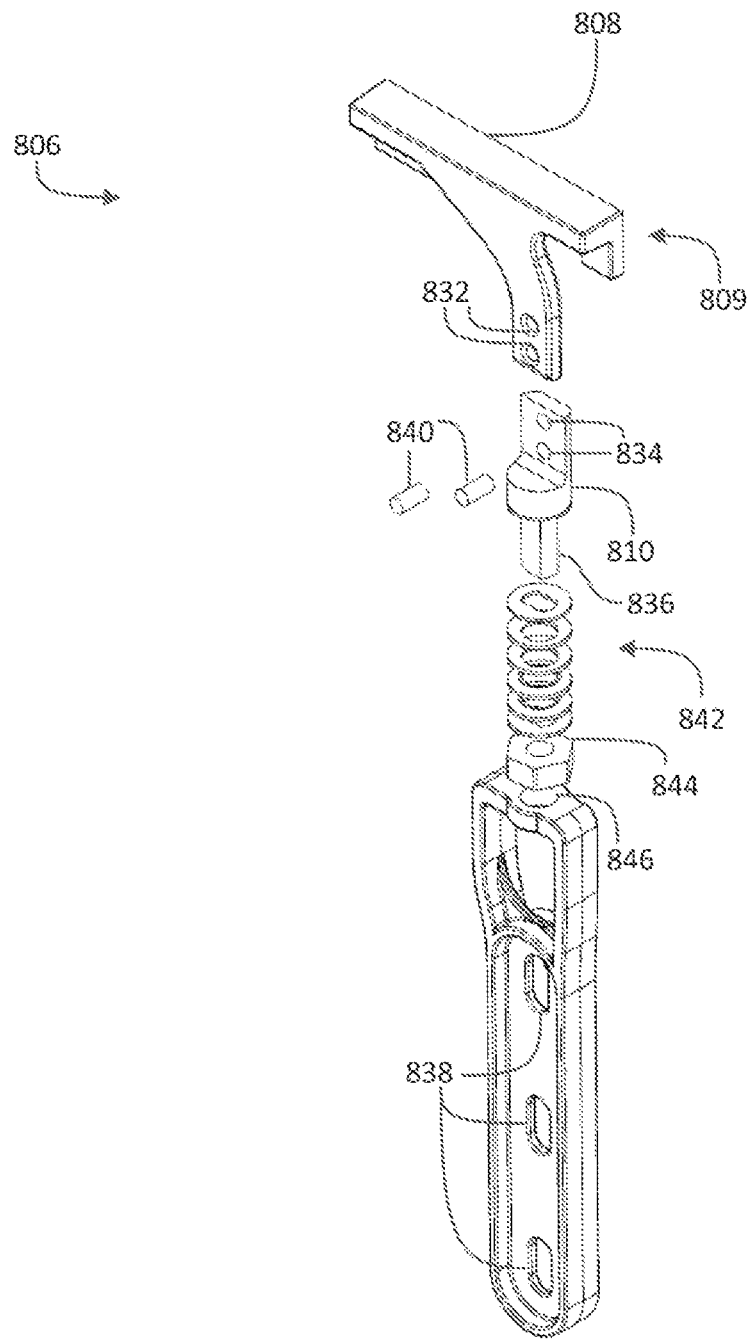
FIG. 12 illustrates an exploded view of the hinge assembly according to an embodiment.

FIG. 12 illustrates an exploded view of the hinge assembly 806 according to an embodiment. As discussed above, the hinge assembly 806 includes the carriage head 808, the carriage mount 810, and the mounting block 812. The carriage head 808 includes openings 832 respectively configured to receive a fastener, as discussed in greater detail below. The carriage mount 810 includes openings 834 respectively configured to receive a fastener, as discussed in greater detail below. The carriage mount 810 further includes a chamfered protrusion 836 configured to be coupled to the mounting block 812.

The mounting block 812 includes openings 838 respectively configured to receive a fastener (not illustrated). For example, the openings 838 may be configured to receive a fastener to couple the mounting block 812 to a display portion. For example, the openings 838 may be configured to receive fasteners to couple the mounting block 812 to the auxiliary display 804.

In at least one embodiment, the carriage head 808 may be configured to be coupled to the carriage mount 810 by fasteners 840. For example, the fasteners 840 may be rivets respectively configured to be inserted into one of the openings 832 and one of the openings 834. In one embodiment, the fasteners 840 may include two rivets, the openings 832 may include two openings, and the openings 834 may include two openings.

In at least one embodiment, the carriage mount 810 is configured to be coupled to the mounting block 812 via the chamfered protrusion 836. For example, the chamfered protrusion 836 may be configured to be inserted through one or more washers 842 and a coupling nut 844. The coupling nut 844 may be configured to be coupled to an end of the chamfered protrusion 836. For example, the chamfered protrusion 836 may be threaded such that the coupling nut 844 may be coupled to the chamfered protrusion 836.

The one or more washers 842 are configured to distribute a load applied by the coupling nut 844. For example, in one embodiment, the chamfered protrusion 836 is configured to pass through an opening 846 in the mounting block 812, the one or more washers 842, and the coupling nut 844. The one or more washers 842 may distribute the load which would otherwise be applied by the coupling nut 844 in direct contact with the mounting block 812.

In one embodiment, the carriage head 808 is manufactured from 17-4 stainless steel. For example, the carriage head 808 may be manufactured from 17-4 stainless steel using metal injection molding. In some embodiments, the carriage head mount 810 and the mounting block 812 may be manufactured from 1144 steel alloy. For example, 1144 steel alloy may be advantageous due to its high stress-resistance. The carriage head mount 810 and the mounting block 812 may be manufactured using metal injection molding.

Accordingly, certain electronic devices, such as laptop computers, may include or be connected to one or more display devices. For example, the laptop computer 100 includes the primary screen 105 to display information, and the laptop computer 100 may be coupled to at least one auxiliary monitor, such as the auxiliary monitor 102, to display additional information. As discussed above, the auxiliary monitor 102 may be removably physically coupled to the laptop computer 100 via the coupling elements 116. While the auxiliary monitor 102 is physically decoupled from the laptop computer 100, the auxiliary monitor 102 may remain communicatively coupled to the laptop computer via a wired or wireless connection, such as the wired connection 116.

It may be advantageous for a user to physically decouple the auxiliary monitor 102 from the laptop computer 100 but continue to use the auxiliary monitor 102. For example, the auxiliary monitor 102 may remain communicatively coupled to the laptop computer 100 and may continue to display output information provided by the laptop computer 100 despite being physically decoupled from the laptop computer 100. Accordingly, it may be advantageous to enable the auxiliary monitor 102 to be positioned as desired by a user. For example, it may be advantageous to enable an angle of the auxiliary monitor 102 relative to a surface on which the auxiliary monitor 102 is placed to be adjusted to a viewing angle desired by the user, similar to the manner in which certain laptop computers rotate about torque hinges to allow variable orientation of a laptop-computer screen. However, in some examples, the auxiliary monitor 102 may lack a support system to enable a physical position of the auxiliary monitor 102 to be easily controlled by a user.

Figure 17A:
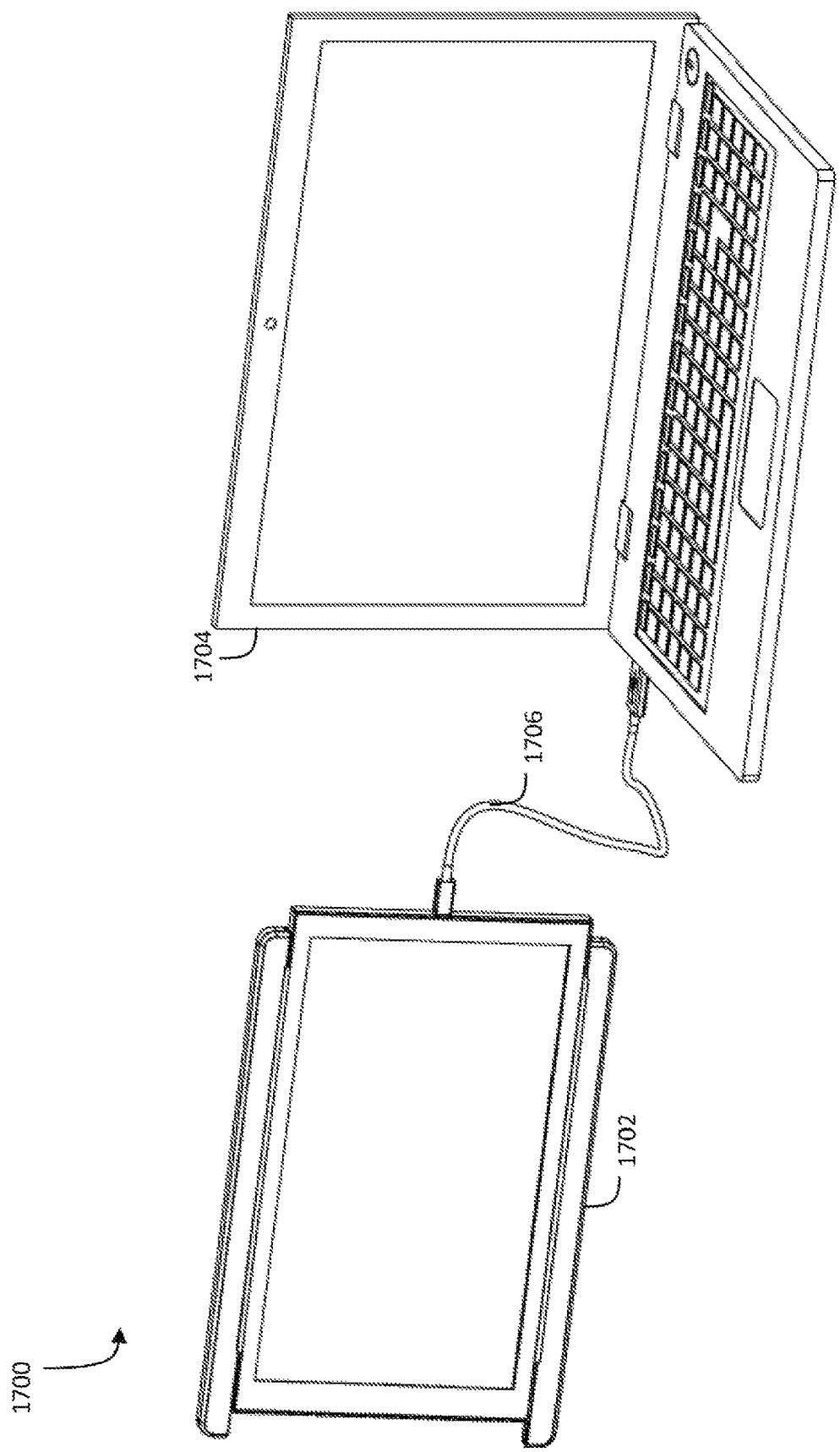
FIG. 17A illustrates a front-perspective view of a display system according to an example.
Figure 17B:
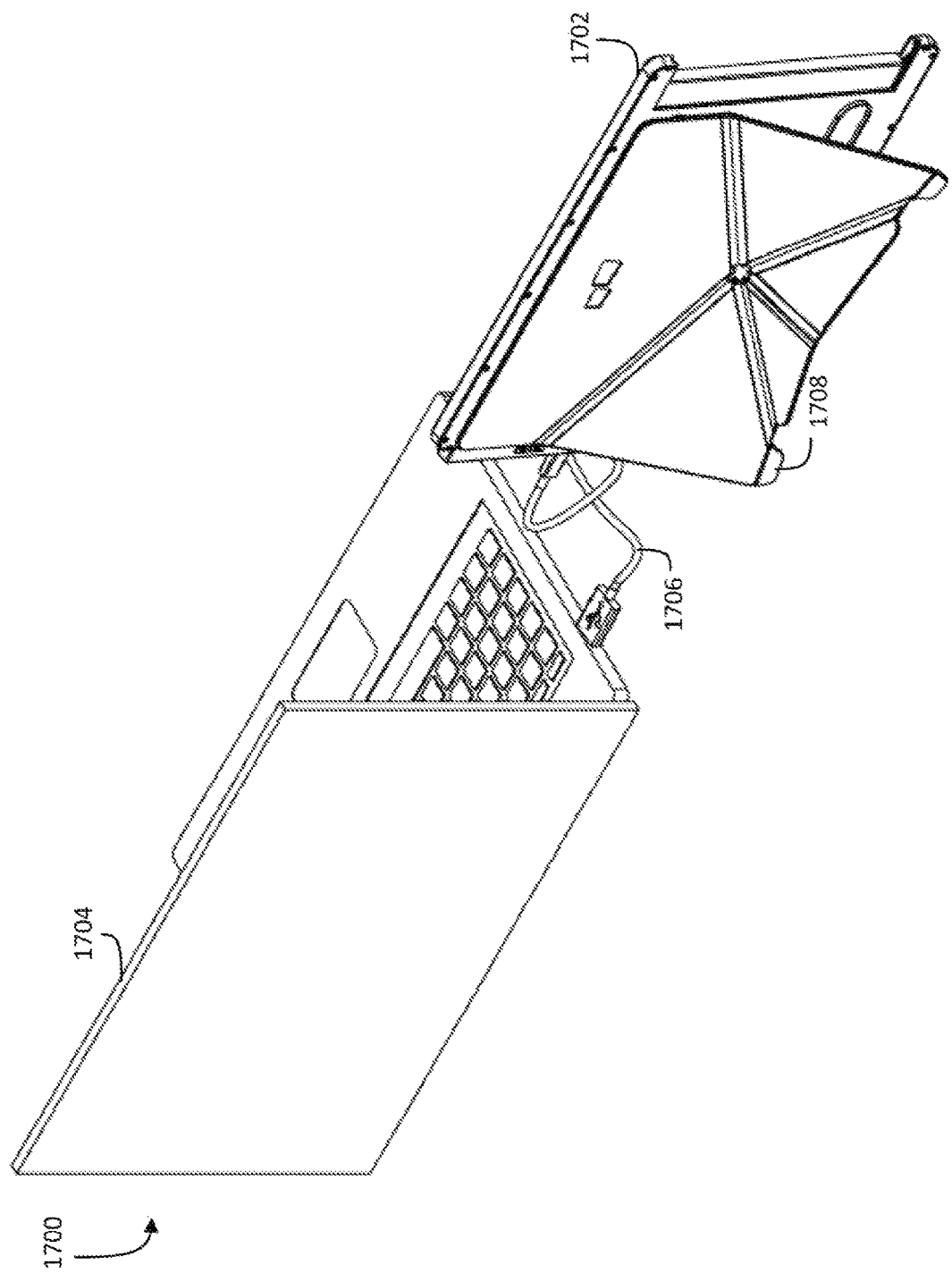
FIG. 17B illustrates a back-perspective view of a display system according to an example.

Examples of the disclosure include an adjustable folding support system to enable a position of a device, such as an auxiliary monitor, to be controlled. For example, the device may be communicatively coupled to a computing device, such as a laptop computer, while the position of the device is controlled. FIG. 17A illustrates a front-perspective view of a display system 1700 according to an example. FIG. 17B illustrates a back-perspective view of the display system 1700 according to an example. The display system includes a display device 1702 which is communicatively coupled to a computing device 1704 via a wired connection 1706. The display device 1702 may be coupled to a support system 1708, which may be configured to enable an orientation of the display device 1702 to be controlled. Accordingly, the display device 1702 and the computing device 1704 may be used in tandem by a user while the display device 1702 is decoupled from the computing device 1704, except, for example, via the wired connection 1706.

In one example, an adjustable folding support system is configured to be physically coupled to an auxiliary display device, such as the auxiliary monitor 102. The support system may be physically coupled to a back surface of the auxiliary display device. The support system may enable an angle of the auxiliary display device to be adjusted by a user to any angle across a continuous range of orientation angles, enabling similar adjustability as torque hinges in a laptop computer. At least because example support systems discussed herein enable an auxiliary display device to be oriented to any angle across a continuous range of angles, example support systems provide significant advantages relative to existing support systems that are only capable of support one or more fixed orientation angles. The support system may include a plurality of joints joining one or more portions of the support system. The plurality of joints may enable the support system to fold across a range of angles and thereby enable a user to adjust a viewing angle of the auxiliary display device to a desired angle.

Figure 13A:
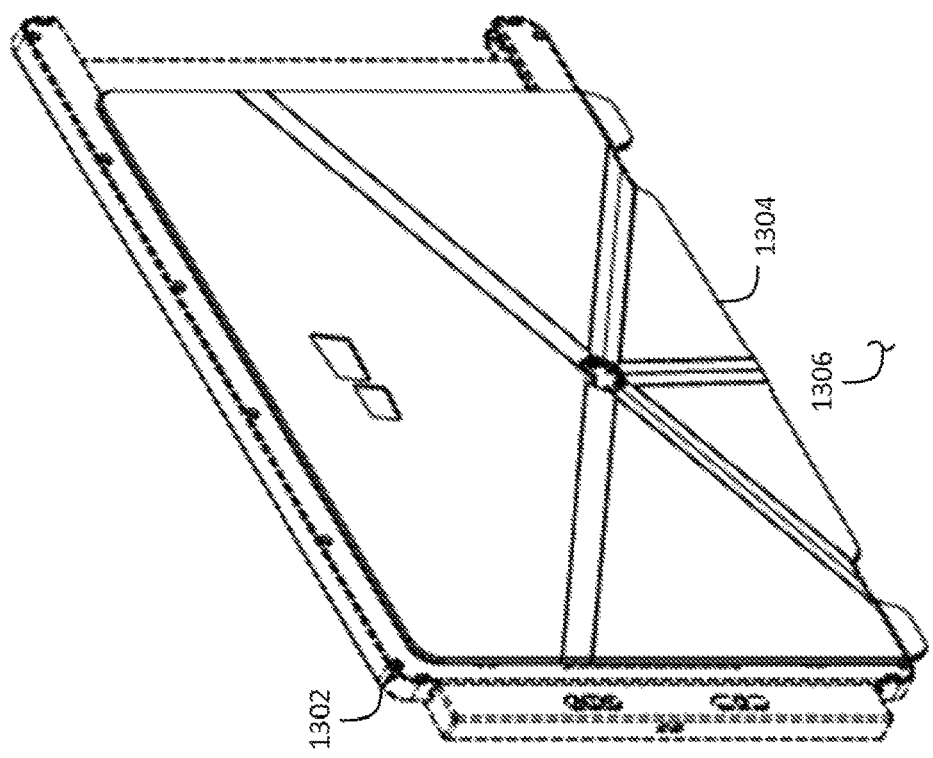
FIG. 13A illustrates a back-perspective view of a display system according to an example.

FIG. 13A illustrates a back-perspective view of a display system 1300 according to an example. The display system 1300 includes an auxiliary display system 1302 (or "display system 1302") and a support system 1304 positioned in an unfolded orientation on a surface 1306. The auxiliary display system 1302 is removably physically coupled to the support system 1304. The auxiliary display system 1302 may include or be an example of the auxiliary monitor 102 or the auxiliary display system 800, for example. The auxiliary display system 1302 may be communicatively coupled to a computing system (not illustrated), such as a laptop computer, smartphone, tablet computer, and so forth, and be configured to display information provided by the computing system as discussed above.

A user may wish to orient the display system 1302 in a particular orientation. For example, it may be desirable to rotate the display system 1302 to a desired angle relative to the surface 1306, referred to herein as an "orientation angle." The support system 1304 enables the display system 1302 to be oriented to a desired orientation angle by providing a physical support to the display system 1302 when the display system 1302 is re-oriented to a desired orientation angle. In some examples, the support system 1304 may unfold to provide physical support to the display system 1302 as the display system 1302 is re-oriented to a desired orientation angle.

Figure 13B:
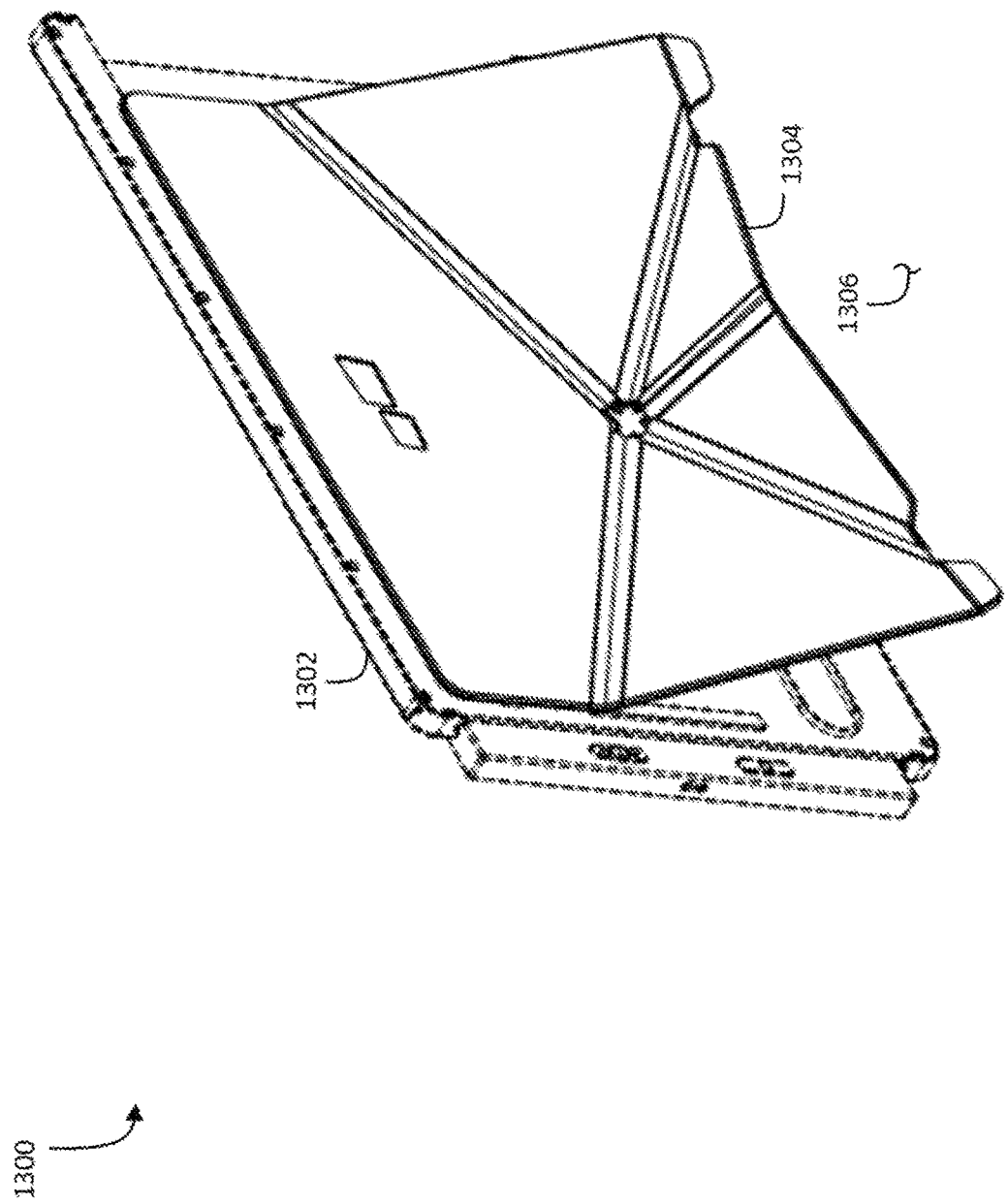
FIG. 13B illustrates a back-perspective view of the display system according to an example in which the display system is oriented at a first angle according to an example.

For example, FIG. 13B illustrates a back-perspective view of the display system 1300 according to an example in which the display system 1302 is oriented at a first angle from the surface 1306, with the support system 1304 being at least partially unfolded to provide physical support to the display system 1302. As the display system 1302 is re-oriented, the support system 1304 opposes a gravitational force exerted on the display system 1302 and thereby enables the orientation of the display system 1302 to be maintained at any angle in a continuous range of angles, including the first angle illustrated in FIG. 13B.

Figure 13C:
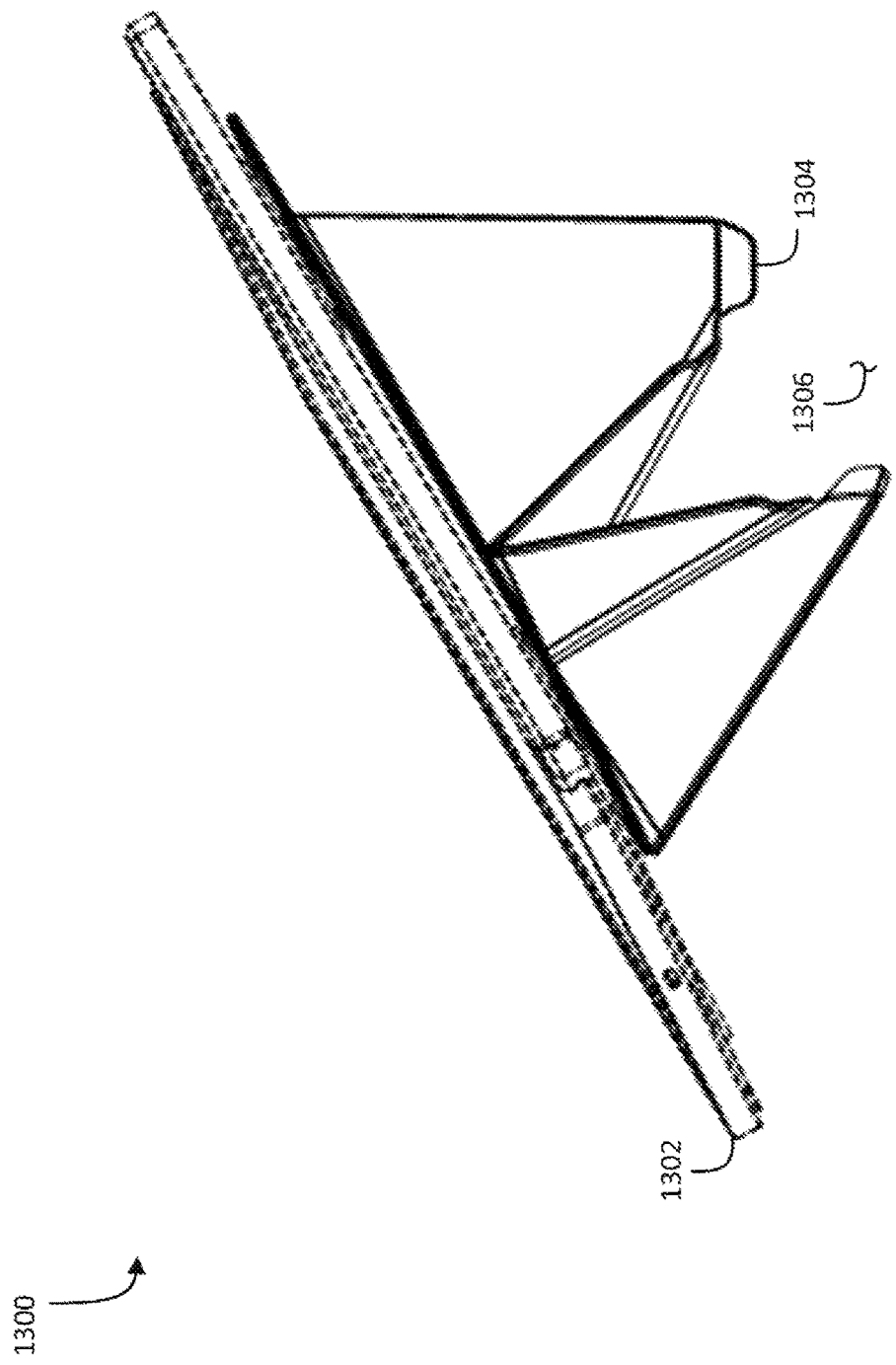
FIG. 13C illustrates a back-perspective view of the display system according to an example in which the display system is oriented at a second angle according to an example.

The support system 1304 may enable the display system 1302 to be oriented across a continuous range of orientation angles. As the display system 1302 is re-oriented across the range of angles, the support system 1304 may unfold across a continuous range of various unfolded positions. For example, FIG. 13C illustrates a back-perspective view of the display system 1300 according to an example in which the display system 1302 is oriented at a second angle from the surface 1306, with the support system 1304 being further unfolded relative to FIG. 13B to provide physical support to the display system 1302. The second angle may be different than the first angle. As is to be appreciated in view of the foregoing discussion, the support system 1304 enables the display system 1302 to be oriented at any orientation angle between the first angle and the second angle.

Figure 13D:
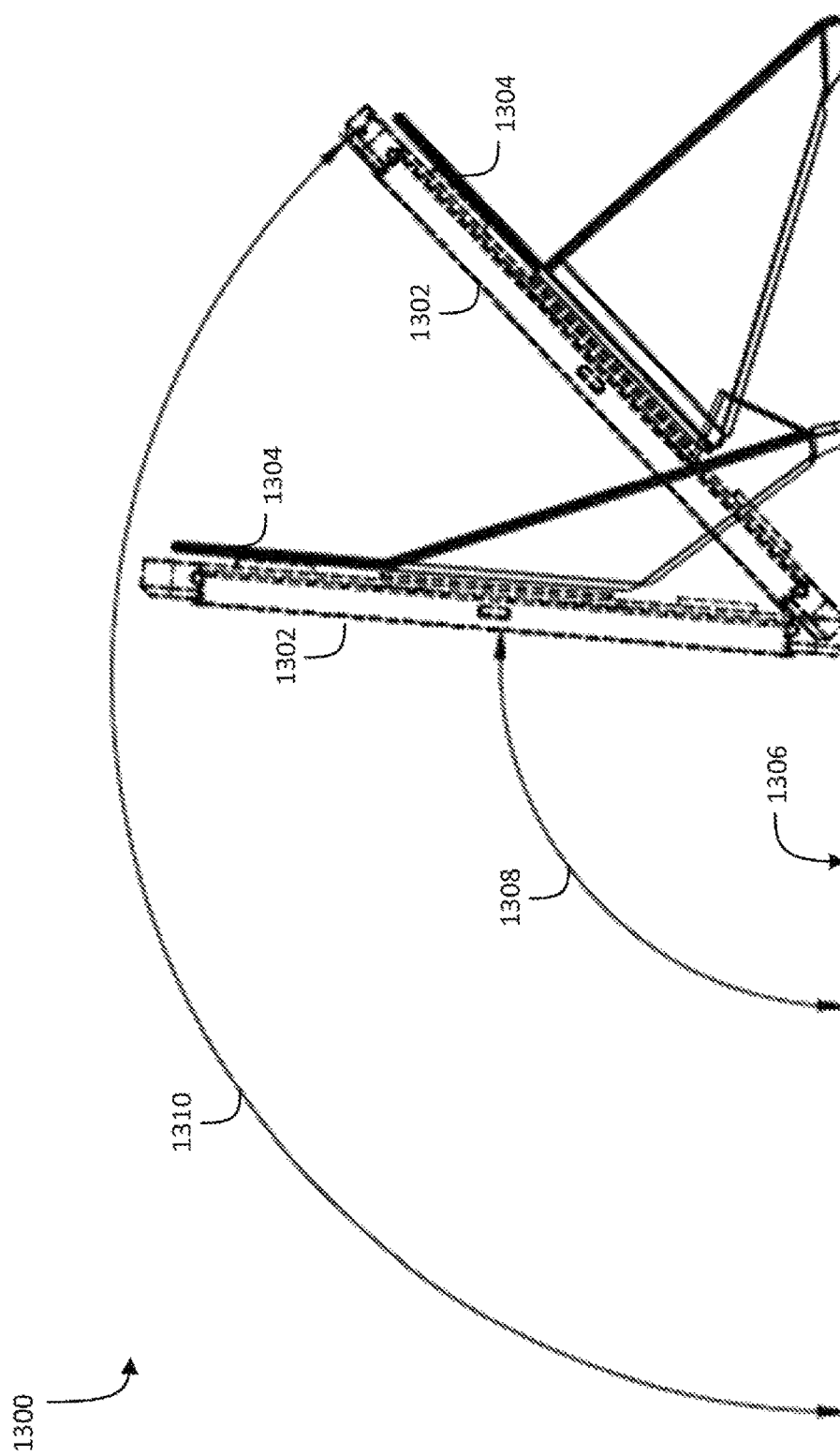
FIG. 13D illustrates a side view of the display system according to an example in which the display system is oriented at the first angle and the second angle according to an example.

For example, FIG. 13D illustrates a side view of the display system 1302 and the support system 1304 at a first angle 1308, as illustrated in FIG. 13B, and at a second angle 1310, as illustrated in FIG. 13C. In one example, the first angle 1308 is approximately 95° (for example, +/−0.01°, +/−0.1°, +/−1°, or other ranges about 95°). In one example, the second angle 1310 is approximately 137° (for example, +/−0.01°, +/−0.1°, +/−1°, or other ranges about 137°). As discussed in greater detail below, the support system 1304 may enable the display system 1302 to be capable of being orientated at any angle between the angles 1308, 1310 rather than being restricted to a finite set of one or more discrete angles. In some examples, an upper bound of an orientation angle may be approximately 180°. In some examples, a lower bound of an orientation angle may be approximately 90°. In various examples, an upper and/or lower bound of an orientation angle may include different values between 90° and 180°.

Figure 14A:
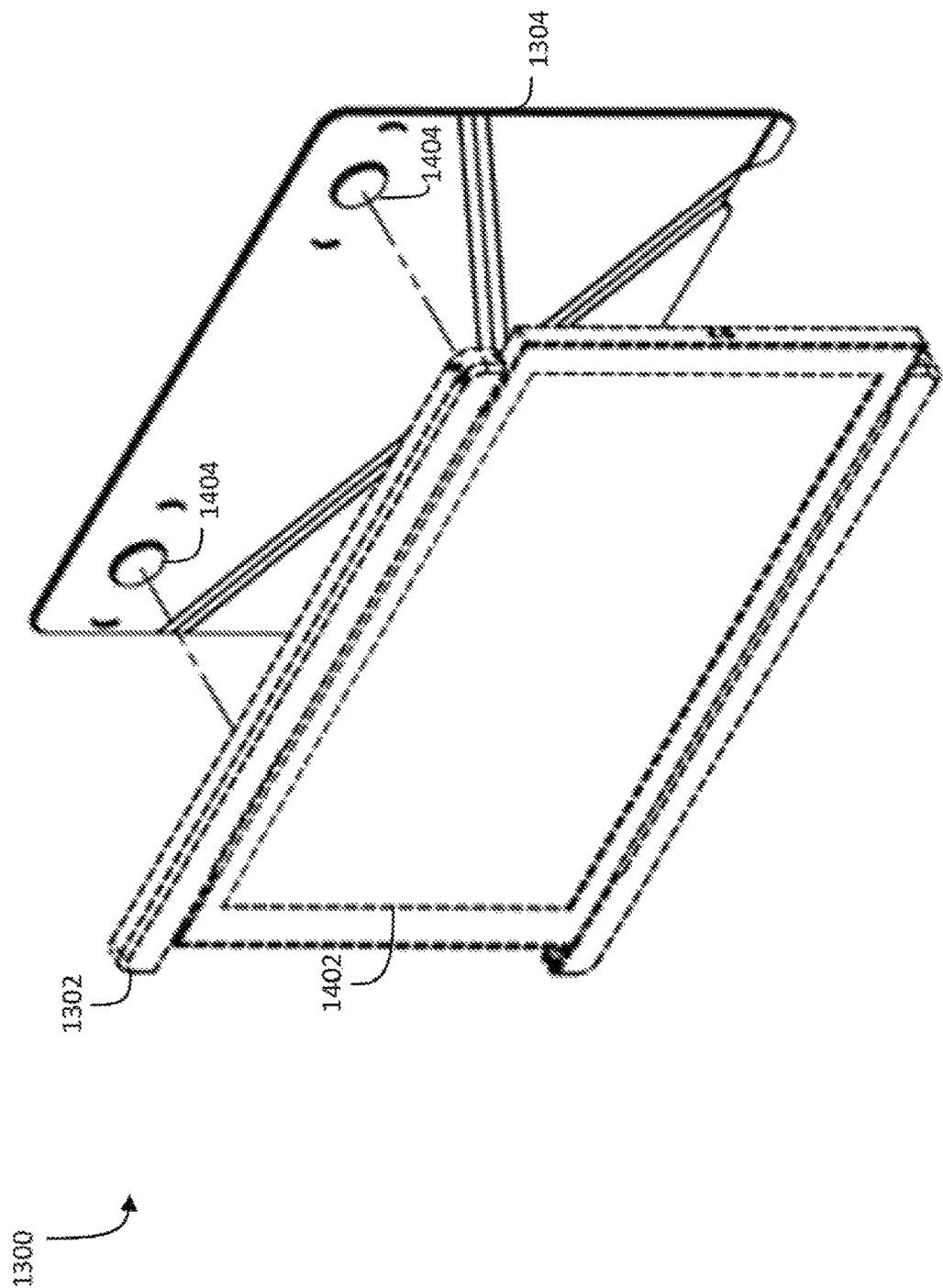
FIG. 14A illustrates a front-perspective view of a support system being coupled to an auxiliary display system according to an example.
Figure 14B:
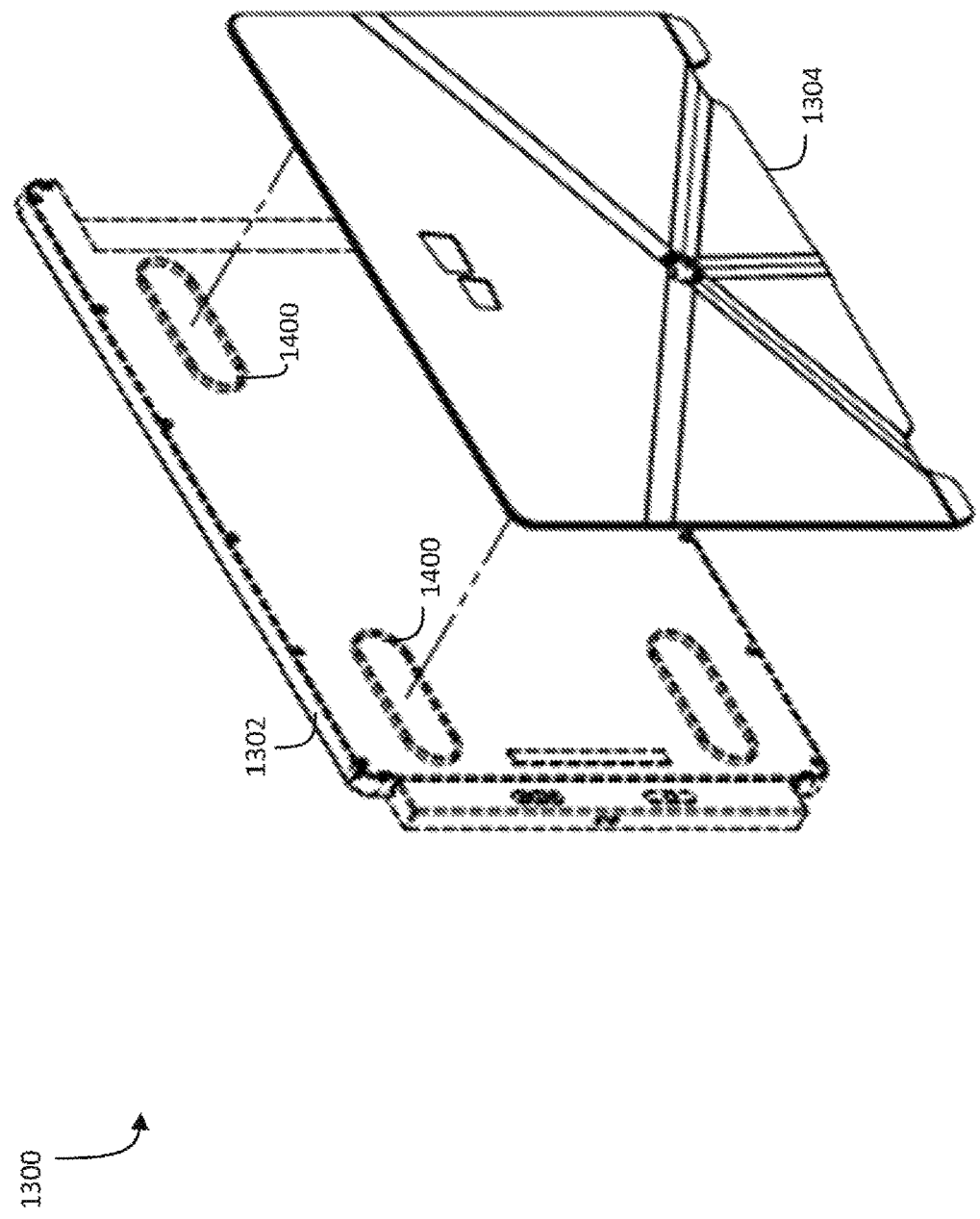
FIG. 14B illustrates a back-perspective view of the support system being coupled to the auxiliary display system according to an example.

The auxiliary display system 1302 may be removably physically coupled to the support system 1304. FIG. 14A illustrates a front-perspective view of the support system 1304 being coupled to an auxiliary display system 1302 according to an example. FIG. 14B illustrates a back-perspective view of the support system 1304 being coupled to the auxiliary display system 1302 according to an example.

The auxiliary display system 1302 includes coupling elements 1400 and a display portion 1402. For example, the coupling elements 1400 may be substantially similar to the coupling elements 116, and the display portion 1402 may be substantially similar to the display portion 108. In some examples, the coupling elements 1400 may be configured to enable a physical connection with corresponding coupling elements on a computing device, as discussed above with respect to the coupling elements 116 and the laptop computer 100. The coupling elements 1400 may also be configured to enable a physical connection with corresponding coupling elements 1404 on the support system 1304. Thus, the auxiliary display system 1302 may be removably physically coupled to a computing device at a first time, removed and physically decoupled from the computing device at a second time, and physically coupled to the support system 1304 at a third time.

Figure 15A:
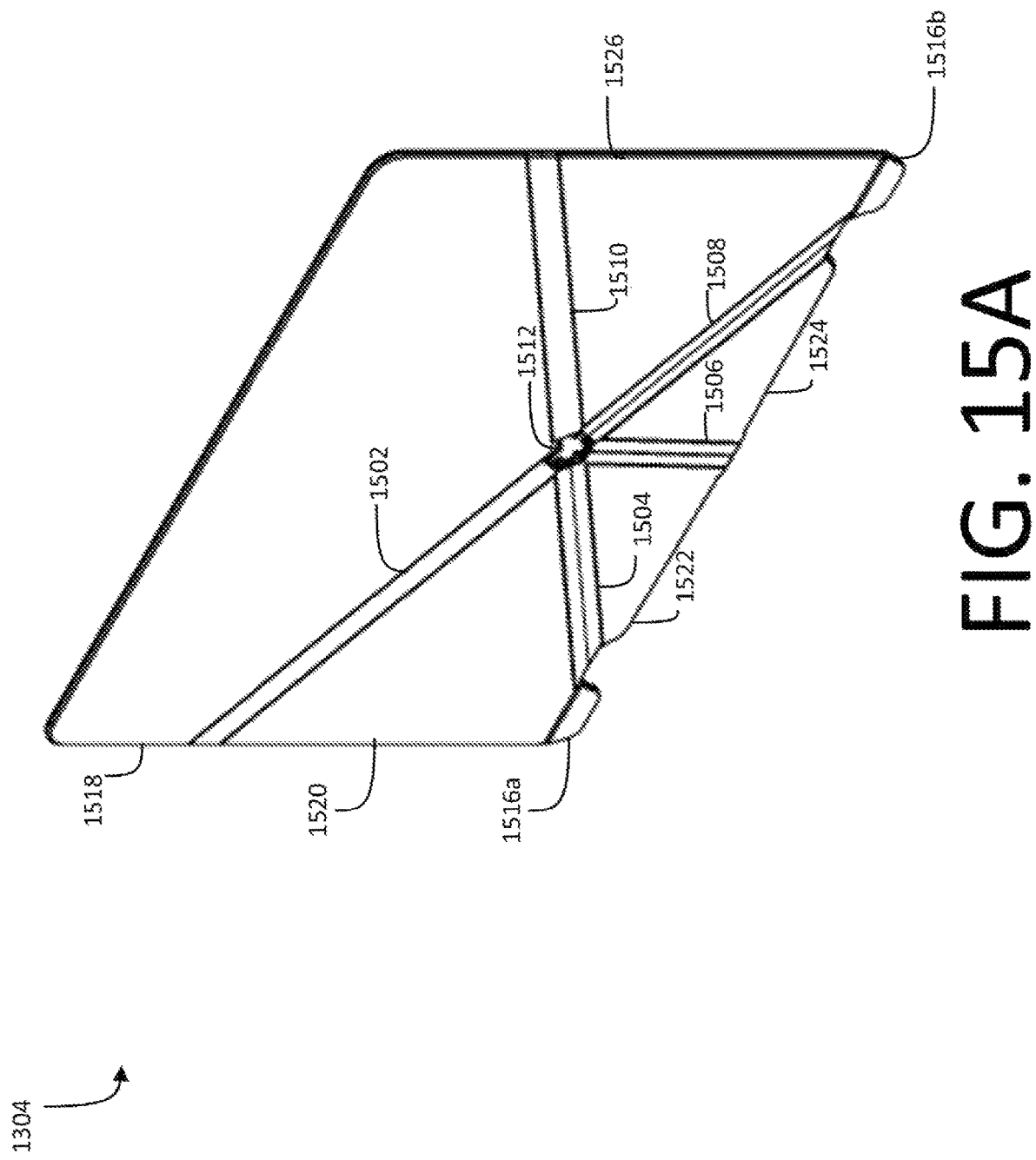
FIG. 15A illustrates a back-perspective view of the support system in an unfolded orientation according to an example.
Figure 15B:
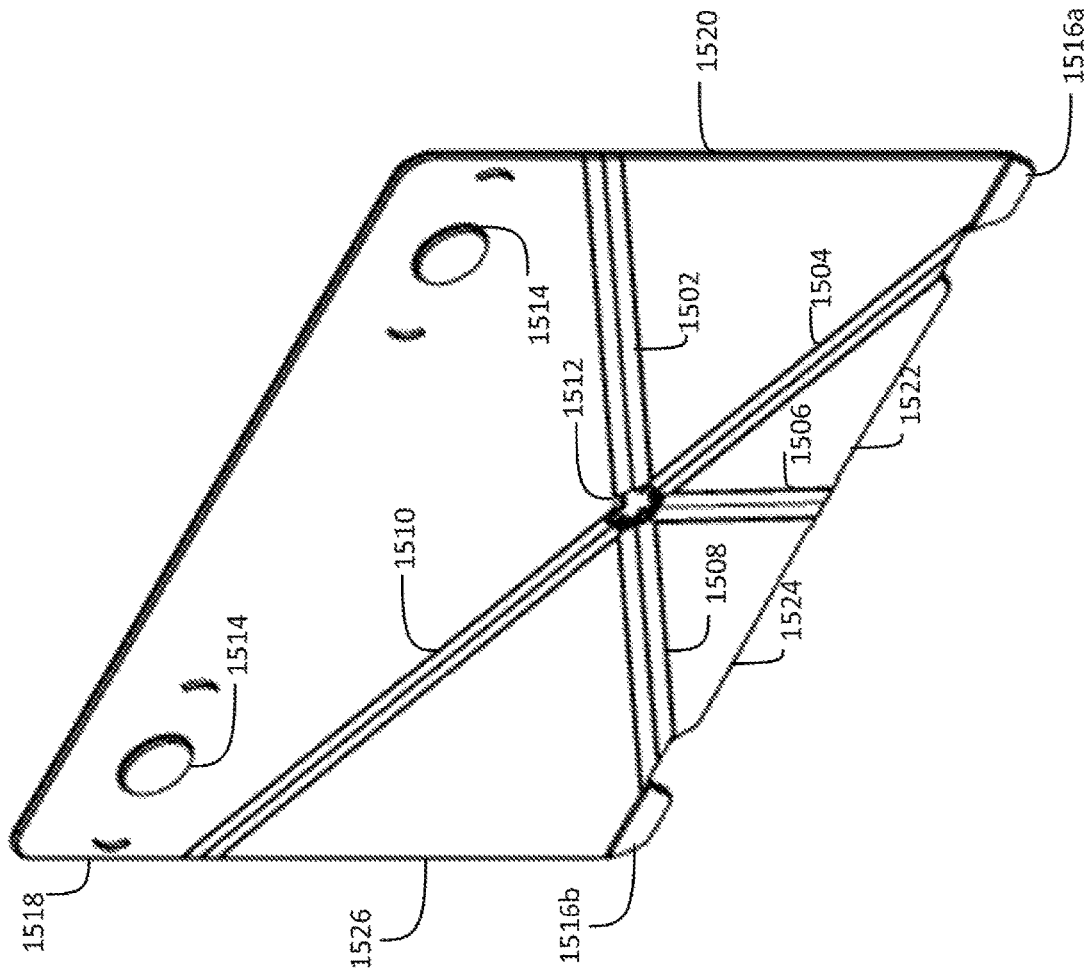
FIG. 15B illustrates a front-perspective view of the support system in an unfolded orientation according to an example.
Figure 15C:
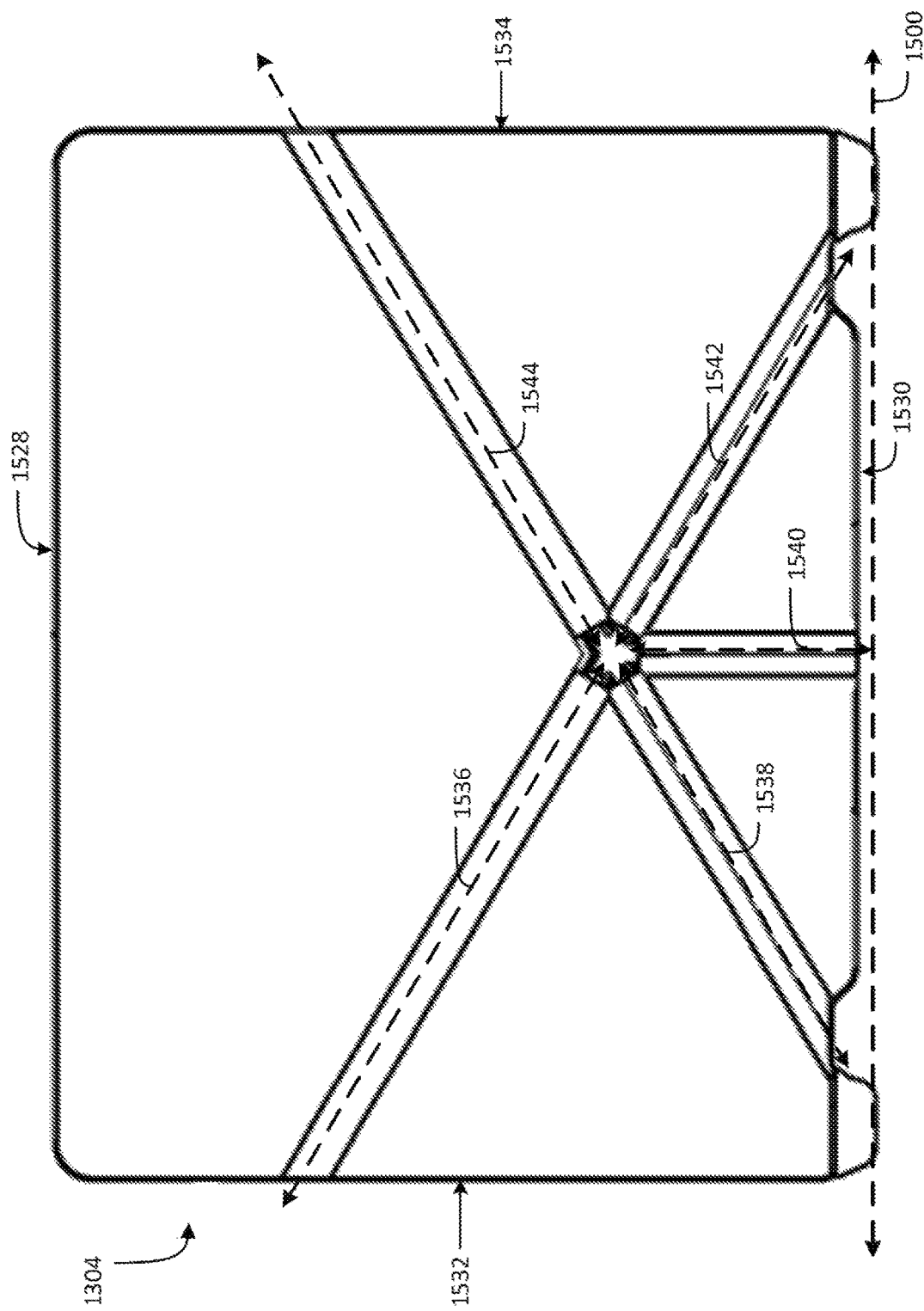
FIG. 15C illustrates a back view of the support system in an unfolded orientation according to an example.
Figure 15D:
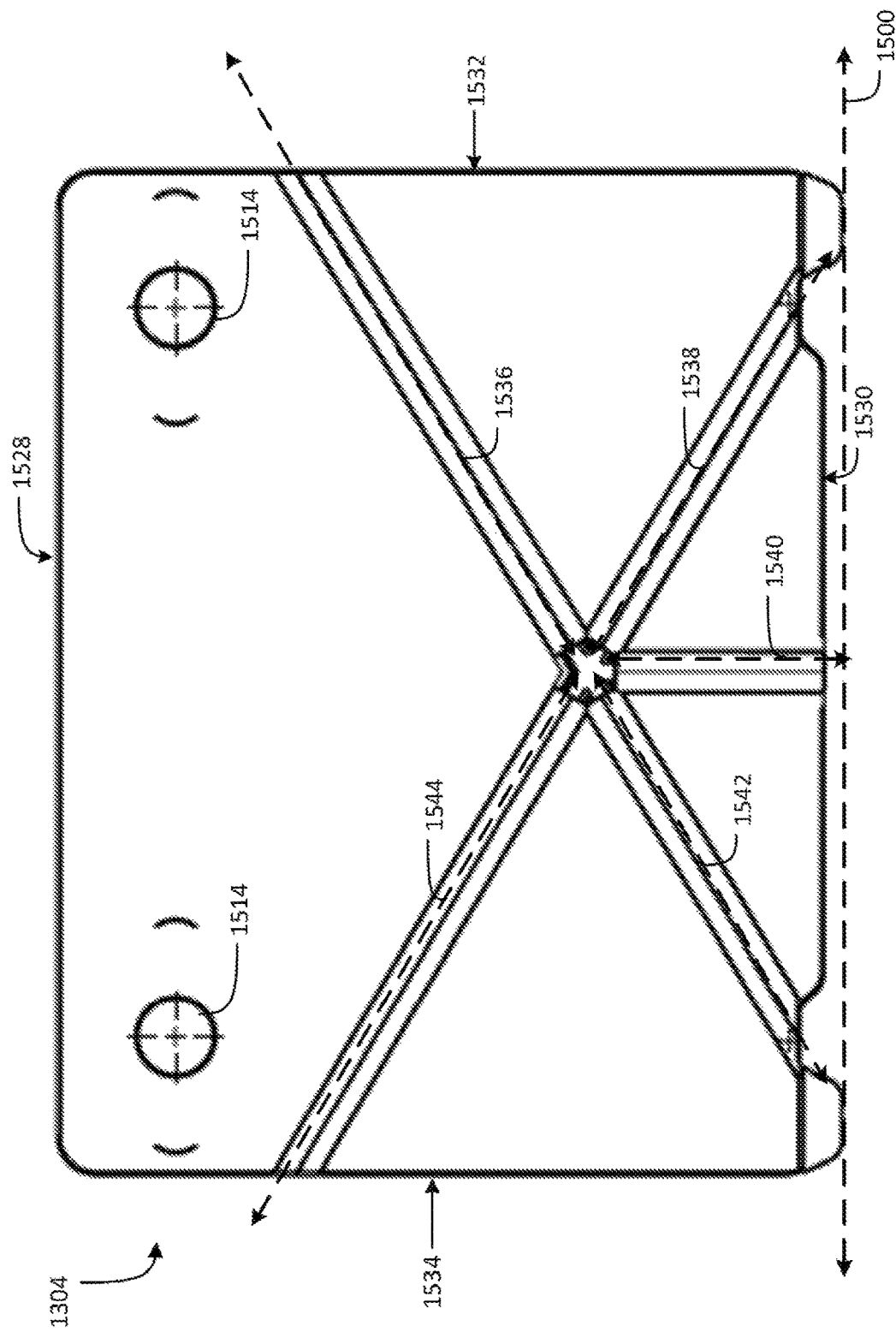
FIG. 15D illustrates a front view of the support system in an unfolded orientation according to an example.
Figure 15E:
FIG. 15E illustrates a side view of the support system in an unfolded orientation according to an example.
Figure 15F:
FIG. 15F illustrates a top view of the support system in an unfolded orientation according to an example.

FIG. 15A illustrates a back-perspective view of the support system 1304 in an unfolded orientation according to an example. FIG. 15B illustrates a front-perspective view of the support system 1304 in an unfolded orientation according to an example. FIG. 15C illustrates a back view of the support system 1304 in an unfolded orientation according to an example. FIG. 15D illustrates a front view of the support system 1304 in an unfolded orientation according to an example. FIG. 15E illustrates a side view of the support system 1304 in an unfolded orientation according to an example. FIG. 15F illustrates a top view of the support system 1304 in an unfolded orientation according to an example.

The support system 1304 is configured to enable rotation about an orientation axis 1500 and includes a first joint 1502, a second joint 1504, a third joint 1506, a fourth joint 1508, a fifth joint 1510, a joint origin 1512, coupling elements 1514 (which may be similar or identical to the coupling elements 1404), a first foot 1516a and a second foot 1516b (collectively, "feet 1516"), a first support portion 1518, a second support portion 1520, a third support portion 1522, a fourth support portion 1524, a fifth support portion 1526, a top edge 1528, a bottom edge 1530, a first side edge 1532, and a second side edge 1534. At least part of the top edge 1528 may be substantially parallel to at least part of the bottom edge 1530. At least part of the first side edge 1532 may be substantially parallel to the second side edge 1534. In some examples, the first support portion 1518 may be referred to as a top portion, the second support portion 1520 and the fifth support portion 1526 may be collectively referred to as a middle portion, and the third support portion 1522 and fourth support portion 1524 may be collectively referred to as a bottom portion.

The support system 1304 may be configured to be removably coupled to the auxiliary display system 1302 to provide a physical support to the auxiliary display system 1302 as discussed above. For example, the coupling elements 1514 of the support system 1304 may be removably physically coupled to the coupling elements 1400 of the auxiliary display system 1302. The support system 1304 may enable the auxiliary display system 1302 to be placed on the surface 1306 and rotated to a desired orientation angle about the orientation axis 1500, such as an orientation angle that enables a user to comfortably view content displayed on the display portion 1402 while the auxiliary display system 1302 is placed on the surface 1306. In one example, the auxiliary display system 1302 may remain communicatively coupled to another computing device (not illustrated), such as a laptop computer, smartphone, or tablet, without being otherwise physically coupled to the computing device. Accordingly, the auxiliary display system 1302 and computing device can be used together without physically coupling the auxiliary display system 1302 to the computing device (except, for example, via a data and/or electrical connection) at least in part by coupling the support system 1304 to the auxiliary display system 1302. Although in some examples the auxiliary display system 1302 may be operated and used together with the computing device without being coupled to the support system 1304, the support system 1304 may enable the auxiliary display system 1302 to be practically used by allowing the auxiliary display system 1302 to be oriented at a practical orientation angle as desired by a user.

The first joint 1502 joins the first support portion 1518 and the second display portion 1520. The first joint 1502 extends from the joint origin 1512 to the first side edge 1532 of the support system 1304. The first joint 1502 may include or support one or more first hinges substantially aligned along a first-joint axis 1536 to rotatably couple the first support portion 1518 to the second support portion 1520 about the first-joint axis 1536. In some examples, the first-joint axis 1536 is not parallel to the orientation axis 1500. In some examples, the one or more first hinges may include at least one living hinge. In other examples, the one or more first hinges may include resistance hinges (or "torque hinges"), non-resistance hinges, or other types of hinges in addition to, or in lieu of, a living hinge.

The second joint 1504 joins the second support portion 1520 and the third support portion 1522. The second joint 1504 extends from the joint origin 1512 to an edge of the support system 1304. The second joint 1504 may include or support one or more second hinges substantially aligned along a second-joint axis 1538 to rotatably couple the second support portion 1520 to the third support portion 1522 about the second-joint axis 1538. In some examples, the second-joint axis 1538 is not parallel to the orientation axis 1500. In some examples, the one or more second hinges may include at least one living hinge. In other examples, the one or more second hinges may include resistance hinges, non-resistance hinges, or other types of hinges in addition to, or in lieu of, a living hinge.

The third joint 1506 joins the third support portion 1522 and the fourth support portion 1524. The third joint 1506 extends from the joint origin 1512 to an edge of the support system 1304. The third joint 1506 may include or support one or more third hinges substantially aligned along the third joint 1506 to rotatably couple the third support portion 1522 to the fourth support portion 1524 about a third-joint axis

1540. In some examples, the third-joint axis 1540 is not parallel to the orientation axis 1500. In some examples, the one or more third hinges may include at least one living hinge. In other examples, the one or more third hinges may include resistance hinges, non-resistance hinges, or other types of hinges in addition to, or in lieu of, a living hinge.

The fourth joint 1508 joins the fourth support portion 1524 and the fifth support portion 1526. The fourth joint 1508 extends from the joint origin 1512 to an edge of the support system 1304. The fourth joint 1508 may include or support one or more fourth hinges substantially aligned along the fourth joint 1508 to rotatably couple the fourth support portion 1524 to the fifth support portion 1526 about a fourth-joint axis 1542. In some examples, the fourth-joint axis 1542 is not parallel to the orientation axis 1500. The fourth-joint axis 1542 may be parallel to the first-joint axis 1536. In some examples, the one or more fourth hinges may include at least one living hinge. In other examples, the one or more fourth hinges may include resistance hinges, non-resistance hinges, or other types of hinges in addition to, or in lieu of, a living hinge.

The fifth joint 1510 joins the fifth support portion 1526 and the first support portion 1518. The fifth joint 1510 extends from the joint origin 1512 to an edge of the support system 1304. The fifth joint 1510 may include or support one or more fifth hinges substantially aligned along the fifth joint 1510 to rotatably couple the fifth support portion 1526 to the first support portion 1518 about a fifth-joint axis 1544. In some examples, the fifth-joint axis 1544 is not parallel to the orientation axis 1500. The fifth-joint axis 1544 may be parallel to the second-joint axis 1538. In some examples, the one or more fifth hinges may include at least one living hinge. In other examples, the one or more fifth hinges may include resistance hinges, non-resistance hinges, or other types of hinges in addition to, or in lieu of, a living hinge.

Accordingly, the first support portion 1518 may be coupled to the first joint 1502 and the fifth joint 1510, and may be rotatably coupled to the second support portion 1520 and the fifth support portion 1526 via the joints 1502, 1510, respectively. The second support portion 1520 may be coupled to the first joint 1502 and the second joint 1504, and may be rotatably coupled to the first support portion 1518 and the third support portion 1522 via the joints 1502, 1504, respectively. The third support portion 1522 may be coupled to the second joint 1504 and the third joint 1506, and may be rotatably coupled to the second support portion 1520 and the fourth support portion 1524 via the joints 1504, 1506, respectively. The fourth support portion 1524 may be coupled to the third joint 1506 and the fourth joint 1508, and may be rotatably coupled to the third support portion 1522 and the fifth support portion 1526 via the joints 1506, 1508, respectively. The fifth support portion 1526 may be coupled to the fourth joint 1508 and the fifth joint 1510, and may be rotatably coupled to the fourth support portion 1524 and the first support portion 1518 via the joints 1508, 1510, respectively. In various examples, one or more of the support portions 1518-1526 may be substantially rigid. In at least one example, the support portions 1518-1526 may be composed of or include a rigid material, such as a plastic (for example, acrylonitrile butadiene styrene [ABS] plastic), metal, or another type of rigid material.

A size and/or shape of each of the support portions 1518-1526 may therefore be defined at least in part by a position, orientation, and/or angle of each of the joints 1502-1510 and at least in part by the edges 1528-1534 of the support system 1304. In various examples, each of the support portions 1518-1526 is a polygon having a plurality of vertices. In at least one example, each of the support portions 1518-1526 includes at most a single vertex that is curved, and remaining vertices that are pointed, that is, the intersection of two straight lines.

In one example, outer contours (for example, sides) of the first support portion 1518 are defined at least in part by the top edge 1528, at least a portion of the first side edge 1532, the first joint 1502, the joint origin 1512, the fifth joint 1510, and at least a portion of the second side edge 1534. In at least one example, the first joint 1502 may extend between the joint origin 1512 and the first side edge 1532. In other examples, the first joint 1502 may extend between the joint origin 1512 and the top edge 1528, and/or the fifth joint 1510 may extend between the joint origin 1512 and the top edge 1528, which may re-define outer contours of the first support portion 1518 to include the top edge 1528, the first joint 1502, the joint origin 1512, and the fifth joint 1510. Similarly, outer contours of each of the support portions 1520-1526 may be defined at least in part by respective combinations of the edges 1528-1534, the joints 1502-1510, and the joint origin 1512.

Outer contours of support portions may affect various properties of the respective support portions. For example, the first support portion 1518 may include, or be coupled to, the coupling elements 1514. Configuring the outer contours of the first support portion 1518 such that a footprint of the first support portion 1518 increases may enable greater flexibility in placement of the coupling elements 1514. For example, in one example, the first joint 1502 extends to the first side edge 1532 and the fifth joint 1510 extends to the second side edge 1534, as discussed above. All else being equal, if the joints 1502, 1510 instead extended to the top edge 1528, a footprint of the first support portion 1518 may be reduced, thereby decreasing an available area on which to position the coupling elements 1514.

Examples in which the joints 1502, 1510 extend to respective edges 1532, 1534 may therefore be advantageous at least because the support system 1304 may be able to accommodate a greater range of positioning of the coupling elements 1514, thereby enabling the support system 1304 to interface more easily with devices (including, for example, the auxiliary display system 1302) having variously configured and positioned coupling elements corresponding to (for example, being configured to be coupled to) the coupling elements 1514. A position of corresponding coupling elements on a device to which the support system 1304 is configured to be coupled, such as the auxiliary display system 1302, may be constrained by other factors, such as a form factor of a computing device (for example, a laptop computer) to which the auxiliary display system 1302 is also able to be physically coupled. Accordingly, examples in which the joints 1502, 1510 extend to respective edges 1532, 1534, rather than the top edge 1528, may advantageously facilitate an auxiliary display device coupling to computing devices in a wide range of configurations. This, in turn, may advantageously increase flexibility of the support system 1304 at least because the support system 1304 is capable of interfacing with a wider range of auxiliary display systems.

Various relationships between an orientation and position of the joints 1502-1510 are contemplated. In the following examples, angles may refer to acute or obtuse angles, as distinguished from reflex angles. In one example, the first joint 1502 is parallel to the fourth joint 1508. In one example, the second joint 1504 is parallel to the fifth joint 1510. In various examples, an angle between the third joint 1506 and the fourth joint 1508 may be substantially equal to an angle between the fourth joint 1508 and the fifth joint

1510. In some examples, an angle between the third joint 1506 and the fourth joint 1508 may be within a threshold amount of an angle between the fourth joint 1508 and the fifth joint 1510, such as within 1°.

In various examples (including, for example, examples in which an angle between the third joint 1506 and the fourth joint 1508 is substantially equal to an angle between the fourth joint 1508 and the fifth joint 1510), an angle between the first joint 1502 and the fifth joint 1510 may be substantially equal to an angle between the fifth joint 1510 and the third joint 1506. In various examples, an angle between the first joint 1502 and the fifth joint 1510 may be within a threshold amount of an angle between the fifth joint 1510 and the third joint 1506, such as within 1°.

For example, an angle between the first joint 1502 and the fifth joint 1510 may be approximately 120° (for example, +/−0.01°, +/−0.1°, +/−1°, or other ranges about 120°), an angle between the third joint 1506 and the fourth joint 1508 may be 60° (for example, +/−0.01°, +/−0.1°, +/−1°, or other ranges about 60°), and an angle between the fourth joint 1508 and the fifth joint 1510 may be 60° (for example, +/−0.01°, +/−0.1°, +/−1°, or other ranges about 60°).

In other examples, the first joint 1502 may not be parallel to the fourth joint 1508, and in some examples the second joint 1504 may not be parallel to the fifth joint 1510. An angle between the third joint 1506 and the fourth joint 1508 may be different than an angle between the fourth joint 1508 and the fifth joint 1510. An angle between the first joint 1502 and the fifth joint 1510 may be different than an angle between the third joint 1506 and the fifth joint 1510. Although in some examples the third joint 1506 may be substantially perpendicular to the edges 1528, 1530 and substantially parallel to the edges 1532, 1534, in other examples, the third joint 1506 may be differently oriented.

In various examples, the joint origin 1512 is centered between the edges 1532, 1534. A width of the second support portion 1520 may be substantially equal to a width of the fifth support portion 1526. In some examples, a height of the second support portion 1520 may be substantially equal to a height of the fifth support portion 1526. Similarly, a width of the third support portion 1522 may be substantially equal to a width of the fourth support portion 1524. In some examples, a height of the third support portion 1522 may be substantially equal to a height of the fourth support portion 1524.

In other examples, the joint origin 1512 may not be centered between the edges 1532, 1534. Furthermore, the joint origin 1512 may be centered between the edges 1528, 1530 in some examples, and may not be centered between the edges 1528, 1530 in other examples. A width and/or height of the second support portion 1520 may differ from a width and/or height of the fifth support portion 1526. A width and/or height of the third support portion 1522 may differ from a width and/or height of the fourth support portion 1524.

In some examples, the support system 1304 may be configured to unfold to support a continuous range of orientation angles discussed above with respect to FIG. 13D. A minimum orientation angle may refer to a smallest orientation angle that the support system 1304 can independently enable the auxiliary display system 1302 connected thereto to maintain on a flat surface (that is, a surface having an area vector that is antiparallel to a force-vector of gravity) without interference by other entities, such as a user or objects applying a force to one or both of the support system 1304 and/or the auxiliary display system 1302. A maximum orientation angle may refer to a largest orientation angle that the support system 1304 can independently enable the auxiliary display system 1302 connected thereto to maintain on a flat surface without interference by other entities, such as a user or objects applying a force to one or both of the support system 1304 and/or the auxiliary display system 1302. In examples in which the support system 1304 is configured to unfold in a manner that supports a continuous range of orientation angles, the support system 1304 may enable the auxiliary display system 1302 connected thereto to be oriented at any orientation angle between and including the minimum and maximum orientation angles.

In some examples, a minimum orientation angle may be approximately 90° such that the support system 1304 enables the auxiliary display system 1302 to be oriented approximately perpendicular to a surface on which the auxiliary display system is positioned. In other examples, the minimum orientation angle may be an obtuse angle, such as 91°, 95°, 100.92°, or another obtuse angle. A maximum orientation angle may be any of several obtuse angles, such as 100°, 130°, 135°, 137°, 140.3°, 148°, or another obtuse angle. A minimum orientation angle may be determined at least in part by a position, size, and/or orientation of the feet 1516. For example, where the auxiliary display system 1302 is placed perpendicular on the surface 1306, a distance between the surface 1306 and the feet 1516 may at least in part determine a minimum orientation angle, where a larger distance corresponds to a larger minimum orientation angle. In examples in which the feet 1516 contact the surface when the auxiliary display system 1302 is placed perpendicular on the surface 1306 (that is, when the distance between the surface and the feet 1516 is approximately zero), the minimum orientation angle may be 90°.

As discussed above, the minimum orientation angle is the smallest orientation angle that the support system 1304 is capable of enabling the auxiliary support system 1302 to achieve and maintain, and the maximum orientation angle is the largest orientation angle that the support system 1304 is capable of enabling the auxiliary support system 1302 to achieve and maintain. In some examples, the support system 1304 may be approximately parallel to the auxiliary display system 1302 such that the minimum and maximum orientation angles are also the smallest and largest orientation angles that the support system 1304 itself can achieve and maintain.

The feet 1516 may further enable the support system 1304 to achieve and maintain any angle in the continuous range of angles between the minimum and maximum orientation angles, although in other examples, the support system 1304 may alternately or additionally achieve and maintain certain discrete (that is, non-continuous) angles between the minimum and maximum orientation angles. In various examples, any angle between the minimum and maximum orientation angles may be referred to as "intermediate angles."

At obtuse orientation angles, a gravitational force exerted on the auxiliary display device 1302 may exert a moment on the auxiliary display device 1302 about a point, or points, at which the auxiliary display device 1302 contacts the surface 1306. Rotation and/or movement of the auxiliary display device 1302 caused by the gravitational force may be resisted by an equal and opposite moment exerted on the auxiliary display device 1302 by the support system 1304. The moment results at least in part from a normal force exerted on the support system 1304, via the feet 1516, by the surface 1306, which may oppose the gravitational force in combination with a normal force exerted on the auxiliary display device 1302 at the point, or points, at which the auxiliary display device 1302 contacts the surface 1306.

In some examples, at least a portion of a gravitational force exerted on the support system 1304 may be perpendicular to the gravitational force exerted by the feet 1516 on the surface 1306. An equal and opposite static-friction force and/or kinetic-friction force may be exerted on the feet 1516 by the surface 1306. In various examples, the feet 1516 may be constructed to apply a static-friction force capable of preventing motion of the feet 1516 across the surface 1306 due to a gravitational force. That is, at any orientation angle in some examples, the feet 1516 may apply a static-friction force that is equal to a component of the gravitational force that is perpendicular to a normal vector of the surface 1306. Thus, at least the feet 1516 may enable the support system 1304 to be maintained at any orientation angle in the continuous range of orientation angles between the minimum and maximum orientation angles.

In various examples, a material of the feet 1516 may be selected to achieve a suitable coefficient of static friction between the feet 1516 and the surface 1306 to accomplish the above-described static-friction force. In some examples, the feet 1516 include, and/or are composed of, a rubber material, such as neoprene. For example, where the feet 1516 include neoprene, a coefficient of static friction between the feet 1516 and the surface 1306 at substantially average ambient conditions may be approximately 1.15-1.20 where the surface 1306 is constructed from a rubber material such as neoprene, may be approximately 0.5-0.8 where the surface 1306 is constructed of a cardboard material, may be approximately 0.85-0.95 where the surface 106 is constructed of substantially dry asphalt, and so forth. In other examples, the feet 1516 may include, and/or be composed of, one or more other materials in addition to or in lieu of rubber, such as plastics, natural materials (for example, wood), fabric, metal, and so forth, that enable a suitable coefficient of static friction.

In various examples, the feet 1516 may be composed of and/or include substantially similar materials. In other examples, the feet 1516 may include different materials. Although in some examples the auxiliary display device 1302 may include two feet (for example, the feet 1516), in other examples the auxiliary display device 1302 may include one foot or three or more feet. It is to be appreciated that a position, size, and/or shape of the feet of the auxiliary display device 1302 may be different in different examples.

The joints 1502-1510 may be constructed to further facilitate the ability of the support system 1304 to achieve and maintain any orientation angle between the minimum and maximum orientation angles. As discussed above, each of the joints 1502-1510 may be or include one or more living hinges. For example, the joints 1502-1510 may be or include a flexible material (for example, a rubber material, such as polyurethane) to enable two support portions coupled to the respective joint to rotate relative to one another about at least one of the joint axes 1536-1544. As discussed above, as the support portions 1518-1526 rotate about the joint axes 1536-1544 via the joints 1502-1510, the support system 1304 and the auxiliary display system 1302 may rotate about the orientation axis 1500, which may not be parallel to any of the joint axes 1536-1544.

The joints 1502-1510 may be configured to offer a desirable level of resistance to rotation about the axes 1536-1544. The level of resistance to rotation may be sufficiently small that a user is comfortably able to overcome the level of resistance and rotate the support system 1304 about the joints 1502-1510, but sufficiently large that the support system 1304 does not rotate substantially solely under a gravitational force exerted on the support system 1304 and/or auxiliary display system 1302 while the systems 1302-1304 are placed on the surface 1306. That is, in some examples, a level of resistance to rotation offered by the joints 1502-1510 may be greater than (that is, capable of resisting rotation under the application of) a moment applied to the joints 1502-1510 by gravity but less than (that is, capable of rotating under the application of) a minimum moment applied to the joints 1502-1510 by a user purposely intending to adjust the orientation angle of the systems 1302, 1304 about the orientation angle 1500.

A measure of the level of resistance to rotation offered by the joints 1502-1510 may be expressed at least in part by a flexural modulus of the joints 1502-1510, that is, a tendency for the joints 1502-1510 to resist bending in response to a moment about the joints 1502-1510. A non-limiting example is provided for purposes of illustration of the foregoing principles. It is to be appreciated that in other examples, other implementations may be provided consistent with the foregoing principles.

Figure 16:
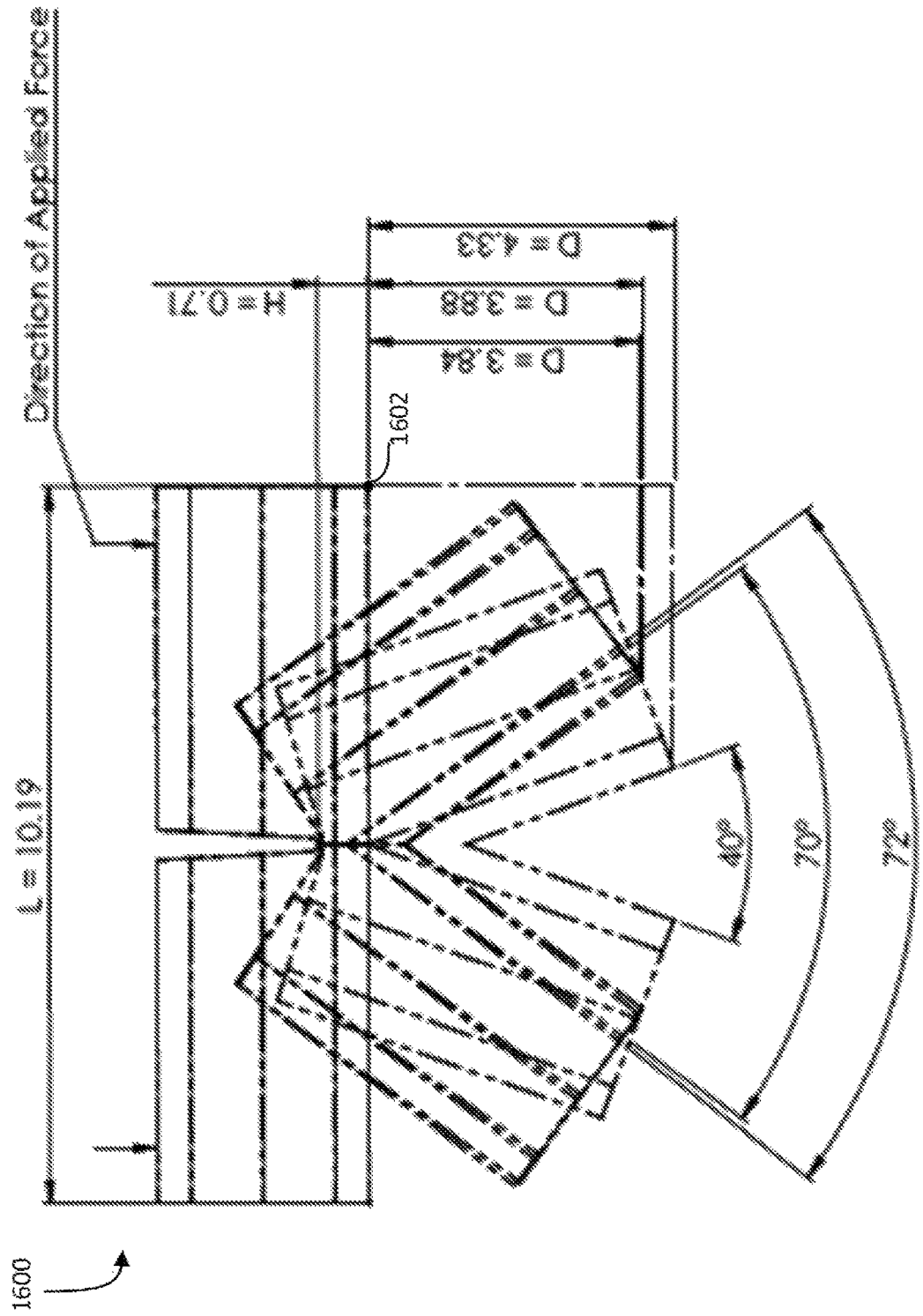
FIG. 16 illustrates a cross-sectional diagram of a joint according to an example.

FIG. 16 illustrates a cross-sectional diagram of a joint 1600 according to an example. The joint 1600 may include any of the joints 1502-1510. The joint 1600 is illustrated in an unflexed position, depicted in solid lines, and various flexed positions, depicted in dotted lines. In various examples, the joint 1600 may be configured to rotate in only one direction from the unflexed position. That is, the joint 1600 may rotate in one orientation (about an axis of rotation of the joint 1600, or "joint axis") to any of the flexed positions under the application of a relatively small amount of force, but may resist rotating in the opposite orientation about the joint axis under a relatively large amount of force. Each of the flexed positions may correspond to a respective one of the joints 1502-1510, as explained in greater detail below.

As illustrated by FIG. 16, a length of the joint 1600, which may include any of the joints 1502-1510, may be approximately 10.19 mm (for example, +/−0.001 mm, +/−0.01 mm, +/−0.1 mm, +/1 mm, or other ranges about 10.19 mm) along a length axis. In other examples, the joint 1600 may have a larger or smaller length. A height of the joint 1600, which may include any of the joints 1502-1510, at a lowest point may be approximately 0.71 mm (for example, +/−0.001 mm, +/−0.01 mm, +/−0.1 mm, +/1 mm, or other ranges about 0.71 mm) along a height axis. A width of the joint 1600, which may be measured along an axis perpendicular to both the length axis and the height axis, may vary between each of the joints 1502-1510. For example, a width of the first joint 1502 and the fifth joint 1510 may be approximately 148 mm (for example, +/−0.001 mm, +/−0.01 mm, +/−0.1 mm, +/1 mm, or other ranges about 148 mm). A width of the second joint 1504 and the fourth joint 1508 may be approximately 106 mm (for example, +/−0.001 mm, +/−0.01 mm, +/−0.1 mm, +/1 mm, or other ranges about 106 mm). A width of the third joint 1506 may be approximately 13.3 mm (for example, +/−0.001 mm, +/−0.01 mm, +/−0.1 mm, +/1 mm, or other ranges about 13.3 mm).

A maximum flexed position of a joint (that is, a position of the joint when the joint is flexed to a maximum deflection angle, such as when the support system 1304 is at a maximum orientation angle) may be expressed in terms of a deflection, which may be measured as a change in distance of a point on the joint 1600 that undergoes a largest displacement in position during deflection. In one example, such a deflection point 1602 may a point at the base of the joint 1600 at a distal end of the joint 1600. The maximum flexed position of the joint may additionally or alternatively be expressed in terms of a deflection angle, which may be measured from the center of the joint 1600 about which the joint 1600 is flexed.

A first example implementation of the joint 1600 may deflect by approximately 4.33 mm (for example, +/−0.001 mm, +/−0.01 mm, +/−0.1 mm, +/1 mm, or other ranges about 4.33 mm), and may have a deflection angle of approximately 40° (for example, +/−0.001°, +/−0.01°, +/−0.1°, +/1°, or other ranges about 40°). For example, the first example implementation may include the third joint 1506. A second example implementation of the joint 1600 may deflect by approximately 3.88 mm (for example, +/−0.001 mm, +/−0.01 mm, +/−0.1 mm, +/1 mm, or other ranges about 3.88 mm), and may have a deflection angle of approximately 70° (for example, +/−0.001°, +/−0.01°, +/−0.1°, +/1°, or other ranges about 70°). For example, the second example implementation may include the second joint 1504 and/or the fourth joint 1508. A third example implementation of the joint 1600 may deflect by approximately 3.84 mm (for example, +/−0.001 mm, +/−0.01 mm, +/−0.1 mm, +/1 mm, or other ranges about 3.84 mm), and may have a deflection angle of approximately 72° (for example, +/−0.001°, +/−0.01°, +/−0.1°, +/1°, or other ranges about 72°).

In each of the foregoing examples, a range of a flexural modulus of the examples of the joint 1600 may be approximately 10-10,000 MPa, and a second moment of area of the examples of the joint 1600 may be approximately 4.41 pm. In these examples, a force applied to the distal ends of the joint 1600 along the height axis may vary based on an implementation of the joint 1600. For example, the force may range from approximately 3.84-3,840 N in an example in which the joint 1600 includes the first joint 1502 or the fifth joint 1510. In another example, the force may range from approximately 2.78-2,780 N in an example in which the joint 1600 includes the second joint 1504 or the fourth joint 1508. In another example, the force may range from approximately 0.39-390 N in an example in which the joint 1600 includes the third joint 1506.

It is to be appreciated that examples of values are provided for purposes of example only, and that in other examples, other values are within the scope of the disclosure. Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A support system comprising:
   at least one coupling element configured to be coupled to an auxiliary display system;
   a plurality of support portions;
   a plurality of joints, each joint of the plurality of joints being coupled to a first respective support portion and a second respective support portion of the plurality of support portions, the first respective support portion being rotatably coupled about a respective joint axis to the second respective support portion via the respective joint; and
   a foot coupled to at least one of the plurality of support portions,
   wherein rotating the plurality of support portions about the plurality of joints rotates the support system about an orientation axis in a continuous range of orientation angles between a minimum orientation angle and a maximum orientation angle,
   wherein at least one of the plurality of joints or the foot resist a force of gravity to enable the support system to maintain any orientation angle in the continuous range of orientation angles, and
   wherein the minimum orientation angle is at least 90° from a surface on which the support system is positioned.

2. The support system of claim 1, wherein the plurality of support portions includes a first support portion, a second support portion, and a third support portion.

3. The support system of claim 2, wherein the plurality of joints includes a first joint and a second joint, and wherein the first support portion is rotatably coupled to the second support portion via the first joint and the second support portion is rotatably coupled to the third support portion via the second joint.

4. The support system of claim 3, wherein the first support portion is coupled to the at least one coupling element.

5. The support system of claim 3, wherein the plurality of support portions includes a fourth support portion.

6. The support system of claim 5, wherein the plurality of joints includes a third joint, and wherein the fourth support portion is rotatably coupled to the second support portion via the third joint.

7. The support system of claim 6, wherein the plurality of support portions includes a fifth support portion.

8. The support system of claim 7, wherein the plurality of joints includes a fourth joint, and wherein the fifth support portion is rotatably coupled to the third support portion via the fourth joint.

9. The support system of claim 8, wherein the plurality of joints includes a fifth joint, and wherein the fourth support portion is rotatably coupled to the fifth support portion via the fifth joint.

10. The support system of claim 9, wherein an angle between the first joint and the second joint is approximately 120°.

11. The support system of claim 9, wherein an angle between the second joint and the fourth joint is within 1° of an angle between the first joint and the third joint.

12. The support system of claim 9, wherein an angle between the third joint and the fifth joint is within 1° of an angle between the first joint and the third joint.

13. The support system of claim 9, wherein the first support portion is coupled to the at least one coupling element.

14. The support system of claim 13, wherein an angle between the second joint and the fourth joint is approximately 60°.

15. The support system of claim 14, wherein an angle between the fourth joint and the fifth joint is approximately 60°.

16. The support system of claim 1, wherein each joint of the plurality of joints is configured to rotate in one direction about a respective joint axis in an unflexed position of the respective joint axis.

17. The support system of claim 1, wherein the maximum orientation angle is approximately 137° from the surface on which the support system is positioned.

18. A method of operation of a support system comprising:
   providing a support system having
      at least one coupling element configured to be coupled to an auxiliary display system, a plurality of support portions, a plurality of joints, each joint of the plurality of joints being coupled to a first respective support portion and a second respective support portion of the plurality of support portions, the first respective support portion being rotatably coupled about a respective joint axis to the second respective support portion via the respective joint, and a foot coupled to at least one of the plurality of support portions; and instructing a user to rotate the plurality of support portions about the plurality of joints such that the support system rotates about an orientation axis in a continuous range of orientation angles between a minimum orientation angle and a maximum orientation angle, wherein at least one of the plurality of joints or the foot resist a force of gravity to enable the support system to maintain any orientation angle in the continuous range of orientation angles, and wherein the minimum orientation angle is at least 90° from a surface on which the support system is positioned.

19. The method of claim 18, further comprising instructing the user to couple the support system to the auxiliary display system via the at least one coupling element.

* * * * *